(12) United States Patent
Zafiroglu

(10) Patent No.: US 7,425,359 B2
(45) Date of Patent: *Sep. 16, 2008

(54) TEXTURED COMPOSITE MATERIAL

(75) Inventor: Dimitri Peter Zafiroglu, Centreville, DE (US)

(73) Assignee: DZS, LLC, Midlothian, VA (US)

( * ) Notice: Subject to any disclaimer, the term of this patent is extended or adjusted under 35 U.S.C. 154(b) by 68 days.

This patent is subject to a terminal disclaimer.

(21) Appl. No.: 10/611,470

(22) Filed: Jul. 1, 2003

(65) Prior Publication Data

US 2004/0106346 A1    Jun. 3, 2004

Related U.S. Application Data

(63) Continuation-in-part of application No. 10/307,186, filed on Nov. 29, 2002.

(51) Int. Cl.
```
B32B 33/00      (2006.01)
B32B 5/02       (2006.01)
B32B 3/10       (2006.01)
B32B 27/04      (2006.01)
B32B 27/12      (2006.01)
```
(52) U.S. Cl. .................... 428/98; 428/131; 442/59; 442/61; 442/86; 442/148; 442/181; 442/304
(58) Field of Classification Search ................. 442/149, 442/59, 61, 86, 148, 181, 304; 428/85, 98, 428/131

See application file for complete search history.

(56) References Cited

U.S. PATENT DOCUMENTS 1,817,184 A * 8/1931 Fuchs et al. ................. 427/276
2,317,595 A   4/1943 Faris
2,550,686 A   5/1951 Goldman (Continued)

FOREIGN PATENT DOCUMENTS

FR      2160631     6/1973

(Continued)

OTHER PUBLICATIONS

Complete Textile Glossary, 2001, Celanese Acetate.*

(Continued)

*Primary Examiner*—Arti Singh
*Assistant Examiner*—Matthew D Matzek
(74) *Attorney, Agent, or Firm*—The H.T. Than Law Group

(57) ABSTRACT

A floor covering composite made from at least a fibrous outer layer and an adhesive layer is disclosed. These layers are laminated and/or embossed to form elevated areas and depressed areas. Within the depressed areas, fibers from the fibrous outer layer are anchored by the adhesive layer activated by the laminating and/or embossing process. Within the elevated areas, the surface fibers of the fibrous outer layer are substantially free from the activated adhesive, and are movable relative to each other. Transitioning cluster areas are positioned between the depressed areas and the elevated areas. Fibers from the fibrous outer layer are partially bonded by the activated adhesive to provide some structural integrity to the fibers in the elevated areas. The composite may further include a backing layer, a gas permeable, liquid impermeable layer to allow the composite to vent, but prevent liquid from penetrating to the backing layer or to the substrate covered by the composite.

88 Claims, 8 Drawing Sheets

U.S. PATENT DOCUMENTS

| | | | |
|---|---|---|---|
| 2,688,578 A | 9/1954 | Teague | |
| 2,787,571 A | 4/1957 | Miller | |
| 2,810,950 A | 10/1957 | Rice | |
| 2,917,421 A | 12/1959 | Miller | |
| 3,015,149 A | 1/1962 | Foster et al. | |
| 3,081,515 A * | 3/1963 | Griswold et al. | 428/131 |
| 3,166,465 A | 1/1965 | Rahmes | |
| 3,444,035 A * | 5/1969 | Bushnell | 428/172 |
| 3,476,636 A | 11/1969 | Crosby | |
| 3,506,530 A | 4/1970 | Crosby | |
| 3,620,890 A | 11/1971 | Kemmler | |
| 3,669,818 A | 6/1972 | Stark | |
| 3,687,796 A | 8/1972 | Stumpf et al. | |
| 3,695,987 A | 10/1972 | Wisotzky et al. | |
| 3,708,384 A | 1/1973 | Carpenter | |
| 3,720,564 A | 3/1973 | Staats et al. | |
| 3,755,051 A | 8/1973 | Stumpf | |
| 3,816,228 A | 6/1974 | Stumpf | |
| 3,834,978 A | 9/1974 | Nisenson et al. | |
| 3,856,598 A | 12/1974 | Gregorian et al. | |
| 3,860,469 A | 1/1975 | Gregorian et al. | |
| 3,867,243 A | 2/1975 | Stoller | |
| 3,922,454 A | 11/1975 | Roecker | |
| 3,943,018 A | 3/1976 | Petry et al. | |
| 3,947,306 A | 3/1976 | Haemer | |
| 3,950,582 A | 4/1976 | Keuchel | |
| 4,013,407 A | 3/1977 | Ray, Jr. | |
| 4,018,957 A | 4/1977 | Werner et al. | |
| 4,035,215 A | 7/1977 | Goldstone | |
| 4,042,453 A | 8/1977 | Conway et al. | |
| 4,098,629 A | 7/1978 | Goldstone | |
| 4,138,521 A | 2/1979 | Brown | |
| 4,159,360 A | 6/1979 | Kim | |
| 4,172,170 A | 10/1979 | Foye | |
| 4,197,343 A | 4/1980 | Forsythe | |
| 4,217,383 A | 8/1980 | Patterson et al. | |
| 4,278,482 A | 7/1981 | Poteet et al. | |
| 4,324,824 A * | 4/1982 | Narens et al. | 428/92 |
| 4,371,576 A | 2/1983 | Machell | |
| 4,389,442 A * | 6/1983 | Pickens et al. | 428/92 |
| 4,389,443 A | 6/1983 | Thomas et al. | |
| 4,390,582 A | 6/1983 | Pickens, Jr. et al. | |
| 4,426,415 A | 1/1984 | Avery | |
| 4,442,161 A * | 4/1984 | Kirayoglu et al. | 428/219 |
| 4,495,133 A | 1/1985 | Sugihara et al. | |
| 4,582,554 A | 4/1986 | Bell et al. | |
| 4,588,629 A * | 5/1986 | Taylor | 428/88 |
| 4,643,930 A | 2/1987 | Ucci | |
| 4,871,603 A | 10/1989 | Malone | |
| 4,892,777 A | 1/1990 | Wald et al. | |
| 4,919,743 A | 4/1990 | Johnston et al. | |
| 4,942,074 A | 7/1990 | Bell et al. | |
| 4,988,551 A | 1/1991 | Zegler | |
| 5,198,277 A | 3/1993 | Hamilton et al. | |
| 5,310,590 A * | 5/1994 | Tochacek et al. | 428/102 |
| 5,370,757 A | 12/1994 | Corbin et al. | |
| 5,399,409 A | 3/1995 | Whiteman | |
| 5,415,925 A | 5/1995 | Austin et al. | |
| 5,436,064 A | 7/1995 | Schnegg et al. | |
| 5,443,881 A | 8/1995 | Higgins et al. | |
| 5,464,677 A | 11/1995 | Corbin et al. | |
| 5,560,972 A | 10/1996 | Blakely et al. | |
| 5,567,257 A * | 10/1996 | Higgins et al. | 156/72 |
| 5,578,357 A | 11/1996 | Fink | |
| 5,652,041 A * | 7/1997 | Buerger et al. | 428/198 |
| 5,728,444 A | 3/1998 | Fink | |
| 5,747,133 A | 5/1998 | Vinod et al. | |
| 5,874,159 A * | 2/1999 | Cruise et al. | 428/198 |
| 5,882,770 A * | 3/1999 | Makansi | 428/156 |
| 5,902,663 A * | 5/1999 | Justesen et al. | 428/95 |
| 5,939,166 A | 8/1999 | Cheng et al. | |
| 5,962,101 A | 10/1999 | Irwin et al. | |
| 5,965,232 A | 10/1999 | Vinod | |
| 5,990,377 A * | 11/1999 | Chen et al. | 604/381 |
| 6,063,473 A * | 5/2000 | Zafiroglu | 428/86 |
| 6,162,748 A * | 12/2000 | Schilling et al. | 442/226 |
| 6,319,593 B1 * | 11/2001 | Kenmochi et al. | 428/198 |
| 6,506,472 B1 | 1/2003 | Tanaka et al. | |
| 6,774,070 B1 | 8/2004 | Kenmochi et al. | |
| 6,803,334 B2 * | 10/2004 | Mizutani et al. | 442/394 |
| 2002/0119281 A1 | 8/2002 | Higgins et al. | |
| 2002/0132085 A1 | 9/2002 | Higgins et al. | |
| 2003/0232170 A1 * | 12/2003 | Gillette et al. | 428/92 |

FOREIGN PATENT DOCUMENTS

| | | |
|---|---|---|
| FR | 2629678 | 10/1989 |
| GB | 1080046 | 8/1967 |
| GB | 1128801 | 10/1968 |
| GB | 1194027 | 6/1970 |
| GB | 2185213 A | 7/1987 |
| WO | WO 99/19557 A1 | 4/1999 |

OTHER PUBLICATIONS

International Search Report for PCT/US 37464.

* cited by examiner

TEXTURED COMPOSITE MATERIAL

CROSS-REFERENCE TO RELATED APPLICATION

The present application is a continuation-in-part of U.S. patent application Ser. No. 10/307,186 filed on Nov. 29, 2002. The disclosure of the parent application is incorporated herein by reference.

FIELD OF THE INVENTION

The present invention relates to a composite material having a three-dimensional textured surface and which can be used to provide a finished, outer cover for various substrates. More specifically, the invention relates to a textured composite material having a fibrous outer layer, an adhesive layer and an optional backing layer suitable for covering floors, walls, automotive interior surfaces and the like.

BACKGROUND OF THE INVENTION

Solid surface cover materials used in flooring or interior walls include rigid surfaces such as wood, metal, marble or ceramic tile, and resilient surfaces such as vinyl or rubber. They are simple to keep clean and have less of a problem harboring bacterial growth than do textile products. However, solid surface cover materials lack the softness and the textile quality of carpets.

Flooring products such as tufted, knit, knotted or woven carpets, and upholstery or interior wall coverings such as velours or velvets, provide abrasion and wear resistance, as well as cushion and a soft textile feel, by anchoring fibers onto a backing and holding them upright, e.g., as in pile carpet. Compared to rigid solid surfaces, these textile upright oriented fiber products are less durable, tend to collect dust and dirt, provide spaces that allow the growth of bacteria, and are difficult to clean and sanitize.

Hybrid structures, with partially fibrous and partially solid faces such as those disclosed by Petry U.S. Pat. No. 3,943,018, have also been developed. These reduce but do not eliminate the limitations of regular tufted, velours, or flocked textile surfaces.

Attempts have been made to provide flat or profiled, e.g., sculpted surfaces consisting of fibrous layers impregnated with a plastic matrix. For example, see Goldstone U.S. Pat. No. 4,035,215 and U.S. Pat. No. 4,098,629, and Zafiroglu U.S. Pat. No. 6,063,473. Generally, such products have surfaces with a semi-fibrous feel and spaces between the fibers may be sufficiently sealed to prevent bacterial penetration and dirt collection. They also provide somewhat higher abrasion resistance than regular upright-oriented fiber structures. These products largely have a stiff leathery appearance rather than a textile feel. Also the cost of preparing dimensionally stable dense fibrous products, combined with the cost of impregnating and heat setting can be very high.

Other techniques have been tried to produce inexpensive, dirt and bacterial growth resistant, abrasion resistant surface covering materials with a textile fiber appearance. Gregorian U.S. Pat. No. 3,860,469 discloses flat or textured film-like skins placed on top of a pile-like surface. These products combine the qualities of carpet with the solidity of vinyl or rubber, but lack the textile quality and aesthetics of carpets.

Another tactic has been to assemble a basically flat textile fabric over a sublayer of adhesive backed with various layers of sub-surface reinforcement. WO 9919557 utilizes a woven face fabric backed by reinforcing layers. Vinod U.S. Pat. No. 5,965,232 discloses a decorative fabric attached to dimensionally stabilizing or cushioning layers. The fabric is further surface-stabilized. Laminates having a flat fabric face tend to delaminate and/or fray at the edges unless the fabric is thoroughly impregnated with adhesives. However, such impregnation adversely affects the textile feel and cushioning quality of the laminate.

Despite these and other advances in the surface covering art, there remains a need to provide a composite with a fabric outer face that has the desirable properties of soft textile surface coverings.

SUMMARY OF THE INVENTION

An aspect of the present invention is directed to a floor covering composite made from at least a fibrous outer layer and an adhesive layer, wherein these layers are laminated and/or embossed to form elevated areas and depressed areas. Within the depressed areas, the fibers from the fibrous outer layer are anchored in the adhesive layer activated by the laminating and/or embossing process. Within the elevated areas, the exposed fibers of the fibrous outer layer are substantially free from the activated adhesive originated from the adhesive layer, and these exposed fibers can move relative to each other subject only to any pre-existing bonding or entanglement.

Another aspect of the present invention further includes transitioning cluster areas positioned between the depressed areas and the elevated areas. Within the cluster areas, the fibers from the fibrous outer layer are partially bonded by the activated adhesive to provide some structural integrity to the fibers in the elevated areas.

In accordance to another aspect of the present invention, the fibers anchored in the depressed areas are fully embedded by the activated adhesive. In accordance to another aspect of the present invention, the fibers from the fibrous outer layer are not fully embedded by the activated adhesive, but are sufficiently anchored by the activated adhesive, such that delamination is rendered difficult. In other words, separation of the fibrous outer layer from the adhesive layer does not follow along the border between these two layers.

In accordance to other aspects of the present invention, the composite further includes an optional backing layer. The adhesive layer may also be a gas permeable, liquid impermeable layer to allow the composite to vent, but prevent liquid from penetrating to the optional backing layer or to the substrate covered by the composite. The composite may include the adhesive layer and a gas permeable, liquid impermeable layer.

The present invention is directed to a textured composite material having a surface area and comprising a fibrous outer layer and an adhesive layer, wherein the surface area comprises depressed areas and elevated areas, wherein the fibers of the fibrous outer layer in the depressed areas are anchored in the adhesive layer and wherein the fibers on the outer surface of the fibrous outer layer in the elevated areas are substantially unbonded to the adhesive layer.

The present invention is also directed to a textured composite material having a surface area and comprising a fibrous outer layer and an adhesive layer, wherein the fibers in the fibrous outer layer is positioned substantially parallel to the adhesive layer prior to an application of an embossing tool to the layers to form depressed areas and elevated areas on the surface area, wherein in the depressed areas the fibers of the fibrous outer layer are anchored in the adhesive layer, and within the elevated areas the fibers of the fibrous outer layer formed loops upstanding from the adhesive layer.

The present invention is further directed to methods for making the textured composites.

DETAILED DESCRIPTION

Figure 1:
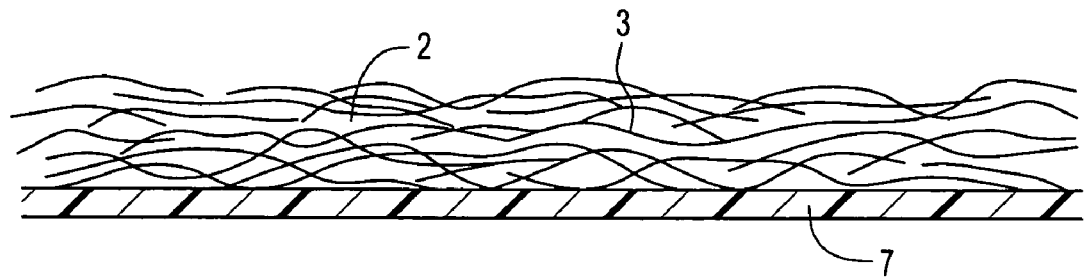
FIG. 1 is a cross-sectional view of a precursor structure for a textured composite material having two layers according to an embodiment of the present invention.

The embodiments of the present invention include, but are not limited to, a three-dimensional textured composite material having two or more layers. A two-layer embodiment comprises a fibrous outer layer and an adhesive layer affixed together by laminating or embossing to the fibrous outer layer. A three-layer embodiment further comprises an optional backing layer. Additional optional layers include, but are not limited to, re-enforcing layer(s), additional fibrous outer layer(s), gas permeable layer(s), liquid barrier layer(s), dust, dirt and/or microbial barrier layer(s) and the like.

In accordance to an aspect of the present invention, the fibrous outer layer and adhesive layer are pattern-embossed to form the three-dimensional textured structure. The three-dimensional textured structure includes depressed areas and elevated areas. Within the depressed areas, activated adhesive anchors the fibers of the fibrous outer layer, by embedding an adequate amount of fibers in the activated adhesive. The depressed areas are densified to over 0.7 gram/cm$^3$. Alternatively, the activated adhesive may fully embed all of the fibers in the depressed areas. Due to compression and embedding of the fibers in activated adhesive, the depressed areas are primarily thin, dense and substantially oriented in a so-called "x-y" direction, i.e., parallel to the plane of the composite. The fibers in the fibrous outer layer in the elevated areas are substantially free of activated adhesive although some surface interaction between the fibrous outer layer and the adhesive layer in the inner strata facing the adhesive layer, i.e., the backside, is permitted. In regions near the peak of the elevated areas, the fibers are preferably disengaged from activated adhesive. Accordingly, in the elevated areas of the fibers of the outer layer fibers are capable of moving relative to each other, and maintain a "textile feel" subject to any preexisting bonding or entanglement in the fibrous outer layer.

In accordance to another aspect of the present invention, fibers from the fibrous outer layer immediately adjacent to the depressed areas may be bonded by some of the activated adhesive. In these clusters, the activated adhesives do not anchor the fibers of the fibrous outer layer, but provide some structural rigidity to these fibers. Due to the increased structural rigidity, the fibers in these cluster areas are advantageously oriented diagonal between the x-y plane of the composite and a "z-direction", which is normal to the x-y plane. The fibers in the cluster areas form an angle of less than about 45° away from the z-direction, and more preferably less than about 30° from the z-direction. This upstanding feature of the fibers in the cluster areas provides the fibers in the elevated areas upstanding loop-like formation. Hence, these loops are anchored in the depressed areas, upstanding in the cluster areas, and bended or looped in the elevated areas.

The relative freedom of movement of fibers in the elevated areas allows the textured composite to retain a good amount of textile appearance and feel. The depressed areas anchor the fibers, and provide enhanced surface stability, the ability to maintain its texture, breaking strength and resistance to abrasion. Additionally, when the optional backing is used, the activated adhesive anchors of the outer layer fibers to the backing layer in the depressed areas, and the backing further enhances the ability of the composite to retain its mainly planar configuration in response to ambient temperature and humidity changes. Upward oriented loops resulting from adhesive clustering at the edges of the depressed areas simulate the plush textile feel and sculpted appearance of pile fiber structured fabric.

FIG. 1 illustrates a precursor structure for a two-layer embodiment of the present invention, which includes a fibrous outer layer 2 and an adhesive layer 7 adjacent to the fibrous outer layer. The fibrous outer layer is shown to be formed of individual fibers 3 placed in a nonwoven web. This is only a schematic representation of the fiber structure and does not limit the structure of suitable fibrous outer layer material. Any construction of the fibrous outer layer described below in greater detail can be used.

Figure 2:
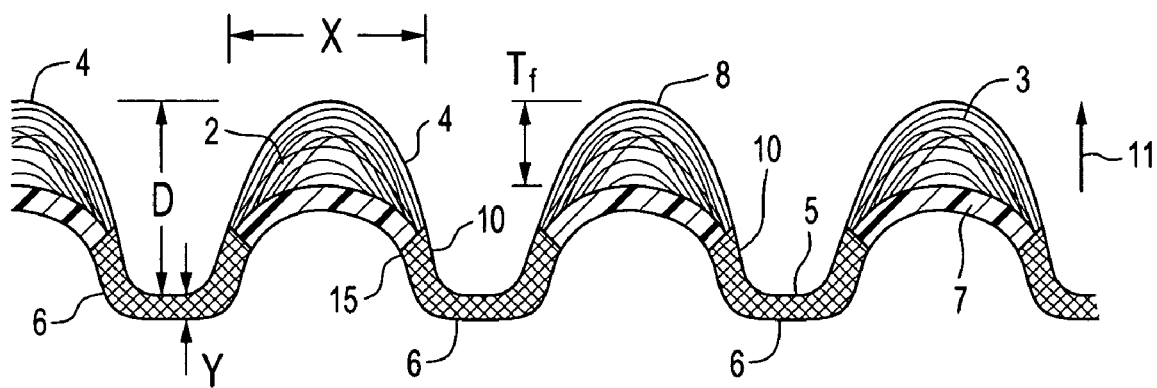
FIG. 2 is a cross-sectional view of a textured composite material according to the present invention formed from the precursor structure of FIG. 1.

FIG. 2 shows a section of the novel two-layer textured composite material formed from the precursor structure in FIG. 1. In the drawings, identical parts are given the same reference numbers. The exposed or outer surface 8 of the composite material is characterized by a plurality of elevated areas 4, which are separated from each other by depressed areas 5. In accordance to an embodiment of the present invention, fibers 3 of the fibrous outer layer 2 within the depressed areas 5 are fully embedded into the adhesive layer 7. In another preferred embodiment, the fibers are not fully embedded into the adhesive layer. The composite formation process, as explained below, activates adhesive 6 within depressed areas 5. Consequently, the activated adhesive forms an integrated solidified mass with fibers 3 such that substantially most or all of the fibers of the fibrous outer layer in the depressed areas are surrounded and bonded together by activated adhesive 6. As much as possible, and preferably most or all of the interstitial space between the fibers in the depressed areas is filled with adhesive layer material, such that the density of the depressed areas is at least 0.7 gram/cm$^3$. Thus, the fibers are bound together and are structurally anchored by the adhesive in depressed areas 5.

FIG. 2 further illustrates that activated adhesive 6 also extends to fibers in transition or adhesive-cluster regions 10 for a nominal distance along the fiber lengths extending from the edges of depressed areas 5 toward elevated areas 4. The adhesive-cluster fibers are oriented substantially diagonal to the z direction, which is indicated by the arrow 11 as discussed above. Thus, the fiber segments in the elevated areas have a prominent upstanding loop-like configuration.

Figure 3:
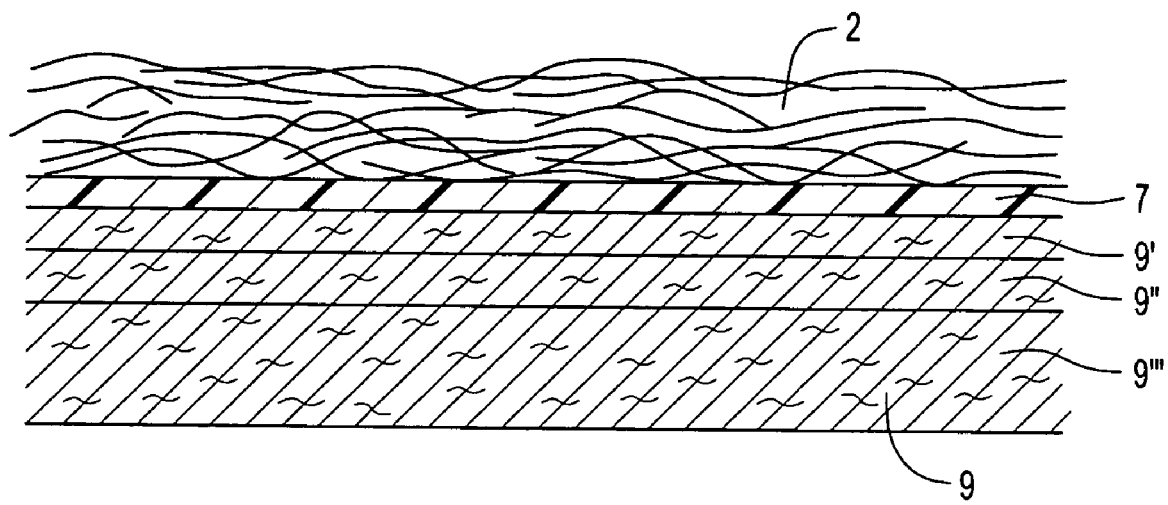
FIG. 3 is a cross-sectional view of a precursor structure for a textured composite material having three layers according to an embodiment of the present invention
Figure 4:
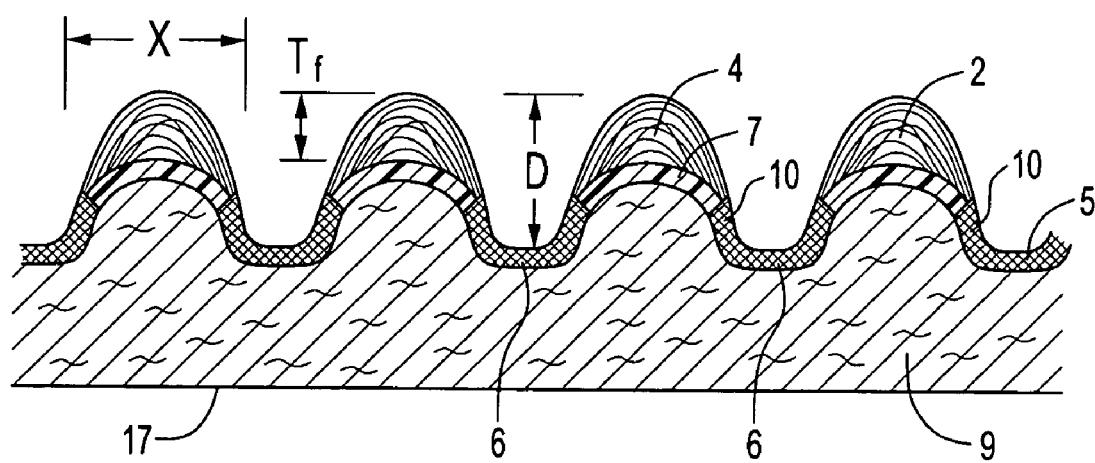
FIG. 4 is a cross-sectional view of a textured composite material according to the present invention formed from the precursor structure of FIG. 3.

FIG. 3 illustrates a precursor structure for a three-layer embodiment of the present invention which includes fibrous outer layer 2 having fibers 3 and adhesive layer 7 adjacent to the fibrous outer layer and optional backing layer 9 adjacent to the adhesive layer on the side opposite to the fibrous outer layer. Another embodiment of the present invention formed from this precursor structure is illustrated in FIG. 4. During the composite formation process, the adhesive activates to bond backing layer 9 to fibrous outer layer 2.

Generally, within elevated areas 4 the outer strata of fibers 3 are substantially free of contact with activated adhesive 6, except in cluster regions 10, where some of the fibers in these regions are bound by activated adhesive 6 thereby providing structural rigidity to the loops formed in the elevated areas, as discussed above. Some internal surface interaction between the fibrous outer layer and the adhesive layer is permitted. Fibers 3 in elevated areas 4 can have small amounts of adhesive on parts of their fiber lengths and occasionally groups of individual fibers can be stuck together by the manufacturing processes that formed fibrous outer layer 2. The adhesive may also penetrate partially along the entire backside of the fibrous layer. In contrast with depressed areas 5, interstitial spacing exists between fibers of the outer layer within elevated areas 4, and the density of elevated areas 4 is significantly lower than the density of depressed areas 5. Notwithstanding the relatively small amount of permissible pre-existing inter-fiber adhesion in elevated areas 4, fibers 3 remain largely free of activated adhesive from the adhesive layer, and therefore, are free to move relative to each other.

In other embodiments, fibrous outer layer 2 is formed from nonwovens in which the fibers are bound to each other at fiber cross over points. For example, fibrous outer layer 2 can contain certain low-melting fiber or powder components, which may or may not be activated prior to the embossing operation utilized to form the textured composite. Prior to or during the embossing operation these, low-melting fiber or powder components can be activated to form bonds between fibers in the elevated areas, so long as fiber 3 within the elevated areas are substantially free of contact with activated adhesive 6.

Fibrous outer layer 2 can also comprise non-entangled fibers and/or lace, woven, knitted or other fabrics in which individual fibers or groups of fibers, i.e., yarns, are woven together, entangled, or otherwise mechanically interconnected or interbonded. Fibrous outer layer(s) can include an open structure, such as lace so that any underlying substrate can be seen through the open structure, or a closed structure so that the underlying substrate is substantially hidden from view.

A durable "integral/continuous" layer of this type simply entails direct immersion of fibers exposed on the surface into the adhesive rich and dense depressed areas 5, at least at one location. Fibers that do not themselves enter depressed areas 5 are secured to other fibers that enter by bonding, entanglement, twisting or other methods.

FIGS. 2 and 4 further schematically illustrate that the undulating shape of fibers between anchor points in depressed areas 5 and free movement portions in the elevated areas form pile-like loops.

Figure 5:
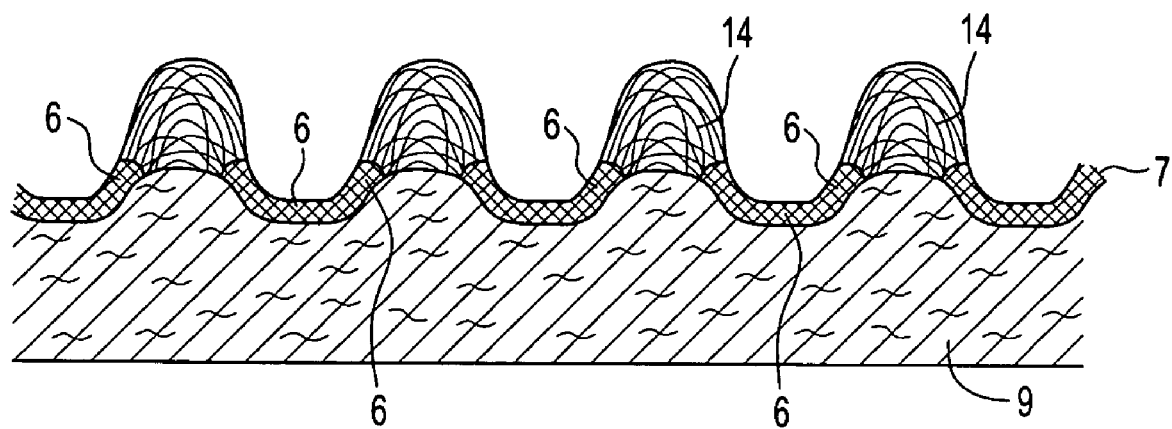
FIG. 5 is a cross-sectional view of another embodiment of a textured composite material according to the present invention.

In another contemplated embodiment seen in FIG. 5, discontinuities or breakages 14 can be created in the adhesive layer 7 during fabrication. Such a discontinuous adhesive layer can occur when the adhesive utilized to form the layer is a thermoplastic sheet that shrinks and splits between depressed areas from exposure to the thermal embossing steps of the composite manufacturing process. Similarly, discontinuities can form when heat from the embossing tool is insulated by the intervening bulky fibrous outer layer that the powder adhesive or thermosetting paste adhesive in the elevated areas does not activate. The un-activated areas of these adhesive types typically are not sufficiently expandable or flexible to conform to the undulating contour of the adjacent surface of the backing layer 9. The adhesive layer thus tends to separate under the elevated areas.

Figure 14:
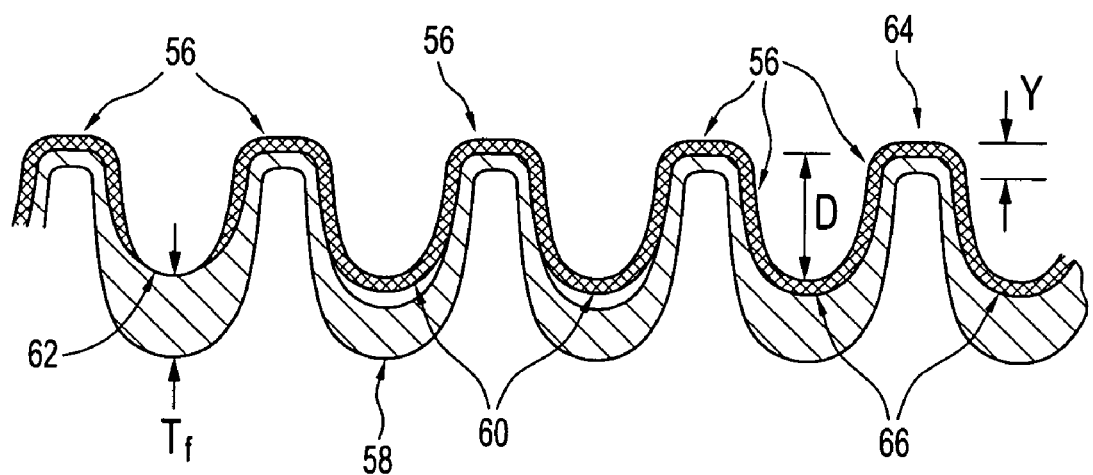
FIG. 14 is a cross-sectional view of another embodiment of a textured composite according to an embodiment of the present invention.
Figure 16:
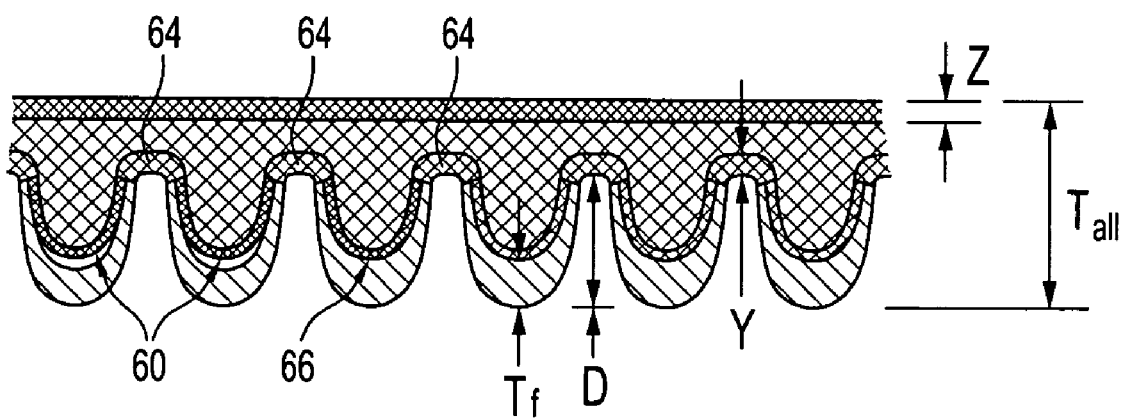
FIG. 16 is a cross-sectional view of another embodiment of a textured composite according to an embodiment of the present invention.

In accordance to another aspect of the present invention, elevated areas 4 define characteristic elevation distances, D (FIGS. 2 and 4). Elevation distance D is defined as the difference in height in the Z direction between the peaks of the elevated areas and the neighboring depressed areas. Thickness $T_f$ of the fibrous outer layer in the finished product is another defining parameter of the composite. This parameter is defined as the thickness in the z direction between the peak of the fibrous outer layer and the adjacent surface of the next underlying layer of the composite. The thickness of the depressed area is defined as Y, as shown in FIGS. 2, 14 and 16, and it is the distance between the exposed face of the depressed area and the maximum penetration of the adhesive.

The three-dimensional texture is further characterized in that the elevation distance D is greater than the thickness $T_f$ of the fibrous outer layer in the elevated areas. Preferably, the ratio of D to $T_f$ is greater than about 1.25, more preferably greater than about 1.5, and most preferably greater than about 2.0.

With reference to FIG. 2, it is seen that a novel two-layer composite in which D is greater than $T_f$ will have an undulating reverse or bottom side 15. The undulations on the reverse side occur when the adhesive layer is thin, that is, less than about 0.12 mm (5 mils). When a thicker adhesive layer is utilized an undulating reverse side will occur when a deep probing embossing tool and a soft, impressionable opposing tool are used during composite fabrication to be explained in detail, below. In circumstances, which utilize less deeply probing embossing tools and/or thicker composite sublayers, e.g., as in FIG. 4, the reverse side of the composite will retain a largely flat profile 17.

In accordance to another aspect of the present invention, the density of the fibrous outer layer, i.e., number of fibers per unit volume of the elevated areas is relatively high, although this density remains substantially lower than the density of depressed areas 5. The desired high density is achieved by maintaining the lateral distance X (FIGS. 2 and 4) between adjacent depressed areas relatively small. The combination of high D/$T_f$ ratio and small value of X helps to assure that the textured composite material has superior resistance to abrasion and deformation even though the fibers in the elevated areas are substantially free of activated adhesive. Preferably, distance X should be about 1.5-10 mm, and more preferably about 1.5-4 mm. Moreover, $D/T_f$ ratio and X should be selected to provide a density of the fibrous outer layer of greater than about 0.2 g/cm³. By itself or in combination with a suitable adhesive layer, the high density also provides a good barrier to dust and bacteria, which allow convenient cleaning and sanitizing of the composite. By anchoring the fibers of the fibrous outer layer at small intervals, abrasion resistance, and thus durability of the composite are increased.

While the figures illustrating the present invention show the inventive textured composite as uniformly and regularly undulating composites, the present invention is not so limited. The inventive textured composite may have combinations of embossing patterns of different depths, frequencies and shapes to produce various sculptured effects. Such sculptured effects may include demarcation lines or patterns facilitating cutting and seaming along such lines to hide seams.

Incorporation of a suitable backing layer can impart to the composite a superior resistance to distortion induced by changes in temperature and humidity. Many conventional planar fabric composites can develop a bumpy terrain caused by so-called "doming" and "cupping". Doming is an upward rise in the z-direction from a flat support in the center of a portion of the composite caused by expansion of an upper layer relative to an underlying layer. Cupping is an upward rise in the z-direction from a flat support at the periphery of a portion of the composite caused by a contraction of an upper layer relative to an underlying layer. Matching the thermal and moisture-related expansion and contraction coefficients of the face layer, adhesive layer and backing layer can eliminate or prevent doming and cupping. The undulated shape of the face and adhesive layers makes this matching less critical because the sinusoidal face/adhesive layers expand and contract without placing high stresses on the upper face of the composite.

Stability versus thermal and humidity changes can be determined with a dimensional stability test, as follows. A 20.3 cm×20.3 cm (8 inch×8 inch) square sample of material to be tested is placed on a flat surface in an oven at 80° C. The sample is kept in the oven for 1 minute. The sample is taken from the oven and allowed to cool to room temperature for 30 minutes. The cooled sample is immersed in water and permitted to dry in a horizontal orientation on a flat surface for 48 hours at room temperature. The sample is examined for doming, and cupping. Measurements of vertical offset between the center and the edge of the sample are made immediately prior to removing the sample from the oven, at the expiration of the 30-minute cooling period and at the end of the 48-hour drying period. Less than about 4 mm vertical deflection from a horizontal plane is considered to demonstrate absence of doming or cupping.

In accordance to one aspect of the present invention, the three-dimensional texture of the fibrous outer layer can be formed without the application of heat. For example, the outer layer can be formed of various knits, spunlaced or needle-punched nonwovens and stitch-bonded fabrics. The desired three-dimensional structure, i.e., elevated areas of substantially non-adhered fibers isolated from each other by depressed areas of adhesive-impregnated fibers, can be formed by using thermosetting and/or pressure sensitive adhesives, for example.

In accordance to another aspect of the present invention, the three-dimensional texture of the fibrous outer layer is formed by a thermal operation, such as thermal embossing. To accomplish this, the fibers in the fibrous outer layer should be extensible in the x-y directions under the stress applied during the embossing at elevated temperatures. Upon heating above a softening temperature, such outer fibrous layer will elongate while maintaining fiber form and upon subsequent cooling it will assume its remolded configuration. The fibrous outer layer can also be composed exclusively or in part by materials such as knit, spunlaced, needle-punched non-woven and stitch-bonded fabrics. Such materials are intrinsically extensible in the x-y direction, even when the fibers are formed from inextensible fibers. Other moldable fibrous structures that can be laminated into the three-dimensional textured surfaces of the present invention include webs of unbonded filaments, staple webs, warps of textured yarns, and the like.

Fibers 3 of the fibrous outer layer 2 should be of a material that melts at significantly higher temperature than the activation temperature of the adhesive layer 7. Preferably the temperature differential should be greater than about 20° C., more preferably greater than about 50° C. and most preferably greater than about 100° C. The use of high melting temperature polymeric materials for the fibers is advantageous, because it permits utilizing thermoplastic adhesive compositions that activate at higher temperatures. It also provides a composite that can function in higher temperature service environments. A low melting temperature fiber composition calls for use of a still lower activation temperature adhesive composition. The maximum product service temperature will then be limited by the adhesive activation temperature. Preferably, the melting temperature of the fiber should be at least about 150° C. Thermoplastic synthetic polymeric fibers are preferred. Representative examples of polymers for the fibers include, but are not limited to, polyesters, polyamides, polyaramids and combinations thereof. Polymers melting below 150° C., such as polyethylene and other polyolefins, can be used provided that the adhesive composition has a suitably low melting temperature and that the expected service temperature is sufficiently below the adhesive melting temperature to preserve product functionality. Also, thermosetting adhesive compositions that activate at low temperatures and are stable up to the fiber melting temperature can be utilized with low melting fiber compositions. Natural fibers such as cotton and wool can be used either free of, or blended with, synthetic polymeric fibers.

Commercial examples of fibrous outer layer suitable for use in the present invention include spunbonded polyester nonwovens sold under the tradename Reemay®, spunbonded polyolefin fabrics sold under the tradename Typar® fabric, and spunbonded polyarnide sold under the tradename Cerex® spunbonded nylon fabric. Staple nonwovens containing low-melt thermoplastic binders are also suitable. Knit fabrics that are moldable can be used as well. Woven fabrics that are sufficiently heavy and loosely woven fabrics such that they can shift and deform significantly with localized pressure are also suitable. More specifically, woven fabrics of textured filament or staple yarns having warp and weft densities of less than about 20 yarns per inch can be used.

Particularly suitable fibrous layers for the outer layer are spunlaced nonwoven fabrics that are hydraulically needled with relatively high energy to improve surface stability. Preferably, needling is predominantly performed on the exposed surface, the fibers are under about 2 inches long, and needling energy are over 20 HP.HR/lb. Preferably, the basis weight of the spunlaced outer layer is about 1 to about 5 oz/yd², and the spunlaced outer layer is made from a layered woodpulp/staple composite.

Conformable stitch-bonded fabrics, which utilize elastic, inelastic, textured, flat or thermally shrinkable yarns, are preferred. A vast variety of stitch-bonded fabrics were found to be very highly moldable and therefore suitable for use with the present invention.

Typically, the fibrous outer layer's basis weight is in the range from about 0.07-0.5 kg/m$^2$ (2 to 15 oz/sq. yd.). Fiber deniers may range from microfibers, that is, less than $1.11\times 10^{-7}$ kg/m (1 denier) per filament to about $28\times10^{-7}$ kg/m (25 denier) per filament. Preferably, at least about 50 wt. % of the fibers in the fibrous outer layer should be at least $3\times10^{-7}$ kg/m (3 denier) for improved abrasion resistance. The density of the fibrous outer layer is in the range of about 0.1 g/cm$^3$ to about 0.6 g/cm$^3$, and preferably about 0.2 g/cm$^3$.

Surface characteristics of the fibers used in the fibrous outer layer can affect the adhesion between this layer and the adhesive layer. Preferably, the fibrous outer layer material presents a relatively rough surface toward the adjacent adhesive layer such that a strong bond with the adhesive layer can be formed. For example, gathered fabrics with many fiber loops or ends emerging at this interfacing surface are well suited for the fibrous outer layer in this respect. Tightly woven, knit or highly bonded and surface-bonded spunbond filament nonwoven fabrics may present a relatively smooth interfacing surface to the adhesive layer that good bonding can be difficult. Tight weaves, especially those using non-textured, straight-filament yarns can also present adhesion problems. The reduced adhesion from such smooth interfacing surfaces can be overcome by roughening the interfacing surface of the fibrous outer layer facing toward the adhesive layer. This is disclosed in commonly owned, co-pending patent application entitled "Fabric-Faced Composites and Methods for Making Same," by the same inventor as the present invention and filed on the same day as the present application. This can be accomplished by sanding or brushing the outer layer undersurface to raise ends or loops. In contrast, gathered fabrics with loopy surfaces can be used as formed without the need to roughen their surface.

A textured composite having multiple fibrous outer layers is within the scope of the present invention. Porous thin fabrics, lightweight webs, open arrays of textured yarns and the like can be superposed on other fibrous layers and co-anchored at the depressed areas to provide special decorative or utilitarian effects.

The adhesive layer can be thermoplastic or thermosetting composition, as discussed above. Adhesive in particulate or liquid forms can be applied to the fibrous outer layer by dusting, spraying, dipping, painting, roller coating or other conventional methods. However, the adhesive composition is preferably provided as a continuous layer coextensively underlying the fibrous outer layer. This configuration advantageously facilitates the formation of the three-dimensional texture of the outer layer, because it assures that the tips of the embossing tool will always contact areas where the adhesive is present. In accordance to another aspect of the present invention, the adhesive composition can be selected to have barrier properties that effectively prevent transmission of liquids. Thus, the adhesive layer can be adapted to block spilled liquid from penetrating to the optional underlying backing layer, and to the underlying surface covered by the textile composite material. This enhances the ability to clean the cover material, to resist bacterial growth and odor development beneath the composite material and to retard or eliminate degradation of the substrate. Alternatively, a liquid transmissive composition can be utilized for the adhesive layer. Also, a separate liquid-blocking layer penetrated by adhesive in the depressed areas can be used.

Representative thermoplastic compositions suitable for the adhesive layers in the present invention include polyolefins, such as polyethylene and polypropylene, and substituted polyolefins, such as vinylidene chloride (sometimes known by the tradename "Saran"). Fillers and additives can be added to the adhesive layer to modify the properties of the composite. Incorporation of fillers such as chalk increases stiffness without increasing melt viscosity. Pigments and other additives may be utilized. Polyesters and polyamides' melting temperature are usually too high for use as a thermoplastic adhesive. However, they can be modified by blending with softer, lower-melting polymers to form a polymeric blend. These polyester or polyamide blends have lower adhesive activation temperatures, such that activation does not distort or degrade the fibers in the fibrous outer layer. Therefore, the polymeric blends can be suitable for use as the adhesive compositions.

Thermoplastic adhesive material can be applied as free flowing particles, such as polymer pulp, grains, powder, and staple fibers, as a unitary structure such as a film, in the form of unbonded fibers in a nonwoven web, or as a woven, knit or nonwoven fabric or a combination thereof. Unitary structure thermoplastic adhesive materials tend to contract prematurely during thermal processing to activate the adhesive. However, advantageously according to the present invention, the protrusions of the embossing tool pin the adhesive layer in place prior to shrinking. At the same time, the higher-melting fibrous outer layer insulates the adhesive layer under the elevated areas from direct heat. This reduces or eliminates deformation due to shrinkage from occurring during thermal composite fabrication.

Thermosetting adhesive materials can also be used. These are typically applied as pastes or relatively viscous suspensions or solutions that are applied to a top side of the backing layer or to the underside of the fibrous outer layer. The thermosetting adhesive material then can be activated with heat during the embossing operation.

Thermosetting adhesive should not cure before the three-dimensional texture is formed in the fibrous outer layer. Premature curing of thermosetting adhesive is typically avoided because (a) heat is normally applied to the adhesive layer by the embossing tool through the fibrous outer layer, and (b) the fibrous outer layer typically acts as a thermal insulating material. Care should be exercised when the fibrous outer layer is relatively thin.

Similar to thermoplastic adhesives, thermosetting adhesive materials are chosen to anchor and/or embed the fibers within the depressed areas. Examples of thermosetting adhesives suitable for use in the present invention include, but are not limited to, starches, urethane adhesives and various so-called latex adhesives, such as the styrene butadiene rubber ("SBR") compositions commonly used in the manufacture of carpets.

In embodiments such as the one illustrated in FIGS. 3 and 4, the backing layer is bonded to the side of the adhesive layer opposite the fibrous outer layer, i.e., the underside of the adhesive layer. The backing layer primarily adds structural stability and, in certain embodiments, cushioning to the composite. Structural stability is enhanced by the stiffness and strength of the backing layer, which allows it to resist forces that would tend to stretch and distort the composite laterally. Cushioning can be provided by utilizing a deep and resilient backing layer material. The degree of cushioning can be adjusted by selecting backing materials of different depth and resilience. For example, to achieve high cushion a thicker backing layer of a very resilient, usually porous material, such as a fibrous felt with a density of up to about 0.2 g/cm$^3$ can be used. On the other extreme, the composite can be made firm by using a typically thin backing layer of comparatively less resilient material, such as a synthetic rubber with a density greater than about 1.2 g/cm$^3$.

The present invention can also utilize a combination adhesive/backing layer consisting of a pre-integrated layer of adhesive and a backing layer. Also suitable is a construction where a low-melt thermoplastic adhesive or a thermoset adhesive is pre-introduced into the backing in sufficient concentrations to provide the adhesive level needed to anchor the face layer. An example of such a construction includes a polyester/polyolefin felt with 25-60% polyolefin.

The composition of the backing layer should also have sufficient cohesive strength to endure anticipated wear from use. For example, a textured composite material used for a floor covering utility should be able to withstand the foot traffic duty cycle in the area of floor that the cover will be positioned. Also, the backing layer should be able to adhere well to the adhesive layer. Thus the backing layer can be solid, that is, void free, or porous. If porous it can be formed of fibers, foam and like substances.

The backing layer can be compositionally isotropic. In another aspect backing layer 9 can be stratified and comprise a plurality of strata 9', 9" and 9"' illustrated in FIG. 3. Each sublayer in the stratified backing layer can have a different composition and/or structure to achieve different degree of hardness (i.e., cushioning effect) and porosity. This technique can be used to further tailor the properties of the textured composite material. A compositionally isotropic backing layer can be stratified by treating the surface opposite the fibrous outer layer with adhesive, heat, pressure and/or embossing.

In accordance to another embodiment, a stratified backing layer is formed from a top sublayer, that is, adjacent to the adhesive layer and the fibrous outer layer, and a bottom sublayer. The top sublayer is typically thinner than the bottom sublayer, normally being less than about 10% of the thickness of the backing layer. This top sublayer can be formed of a low melting thermoplastic composition similar to that of the adhesive layer. When the composite material is fabricated the top sublayer fuses with the adhesive layer to create a very strong bond between the backing and the fibrous outer layer. In accordance to another embodiment, the top sublayer of the backing can serve as the adhesive layer and thereby anchor the fibers of the fibrous outer layer directly into the backing layer and eliminate the need of a separate adhesive layer. In accordance to another embodiment, the top sublayer of the backing layer comprises a fibrous composition that provides good adhesion to the underside of the adhesive layer and also is impressionable to create tall elevated areas, i.e., having large D dimension. Particularly preferred for such top sublayers are fibrous felted layers (needle-punched) with a large number of upstanding fibers or fiber loops on their top surface. In another preferred embodiment, the backing layer consists of an elastomeric, open foam layer supported by an underlying relatively rigid bottom sublayer.

Preferably the backing layer weight should be in the range of about 0.14-3.1 kg/m$^2$ (4 and 80 oz/sq.yd) and the total thickness should be about 2-20 mm.

All of the upper part of a backing layer can preferably be prepared by needle punching a blend of heavy denier polyester fibers and low-denier polyolefin fibers so that the polyolefin fibers are driven towards the surface mating with the adhesive and face layers, and the polyester fibers remain relatively planar. In this manner, final adhesion is improved and dimensional stability remains high with the polyester having little or no reaction to humidity or temperature changes.

An exemplary backing layer is a felt with a basis weight in the range of about 4 to about 30 oz/yd and is needle punched with a density of about 300 to about 1000 penetrations per inch. The backing layer can be needle punched from the bottom, and may have a thermoplastic binder layer is attached thereto. The backing layer comprises about 60% to about 90% polyester and about 10% to about 40% polyolefin. The polyester comprises fibers having about 5 to about 25 denier per filament and the polyolefin comprises fibers having about 1 to about 3 denier per filament. The polyester fibers have a length of about 1.5 inches to about 6 inches and the polyolefin fibers have a length of about 0.5 inch to about 2 inches.

Additionally, the backing layer and the adhesive layer can be pre-integrated. The backing layer and the adhesive layer can be laminated by needling. The materials of the backing and adhesive layers are substantially evenly blended and the adhesive layer comprises about 20% to about 60% of the total weight of the combined weights of said two layers. Alternatively, the backing layer may comprise adhesive fibers, and the backing layer has about 40% to about 80% polyester and about 20% to about 60% polyolefin.

Figure 6:
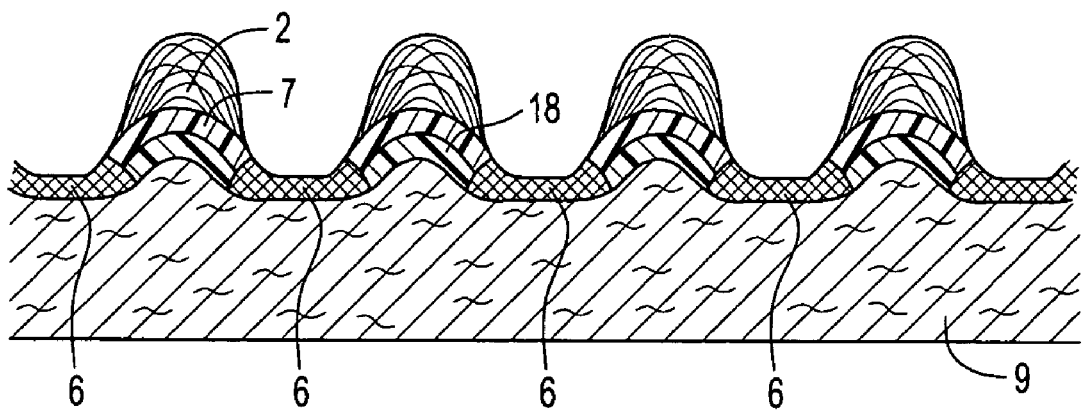
FIG. 6 is a cross-sectional view of another embodiment according to the present invention.

In accordance to another aspect of the present invention, the textured composite material includes an optional breathable layer 18 illustrated in FIG. 6. This layer is of a composition that permits vapor transmission but is a barrier to liquids. Normally the breathable layer is inserted between the adhesive layer 7 and backing layer 9, but can be inserted between fibrous outer layer 3 and adhesive layer 7, if the breathable layer possesses adhesive property. Preferably, the breathable layer is applied as a polymeric film that becomes bonded to the composite during the elevated area formation step of assembly. Representative materials suitable for use as the breathable layer include expanded poly(tetrafluoroethylene) ("e-PTFE") also known as Goretex® fluoropolymer, polyurethane film, plexifilamentary nonwovens such as Tyvek® spunbond polyolefin, subdenier meltblown polyolefin, and the like.

The novel textured composite can be readily formed by a thermal process that involves a combination of laminating and embossing. In general, the process involves providing the individual fibrous and adhesive materials and optional backing and other optional material components that will form the various layers of the composite; juxtaposing the individual components; and then compressing the components at preselected conditions of time, temperature and pressure to effect the lamination. Optionally, the adhesive layer can be pre-tacked to either the face layer or the backing layer.

A combined laminating and embossing treatment is preferably effected by compressing the appropriately stacked layers of individual components against a deeply contoured embossing tool, such as a pressure plate, patterned calender roll or patterning belt. The embossing tool is directed toward the fibrous outer layer side of the stacked precursor materials, illustrated in FIGS. 1 and 3, and presses the back of the stack against an opposing backup tool, such as a second pressure plate, roll or belt. Heat is applied during compression to activate the adhesive components and thereby affect durable bonding of the individual components into an integrated composite.

Preferably, both the adhesive activation and laminating heat are applied to the precursor materials via the embossing tool. Thus, creation of the three-dimensional texture of the fibrous outer layer and the formation of an integrated composite from individual layers occurs simultaneously.

Figure 7:
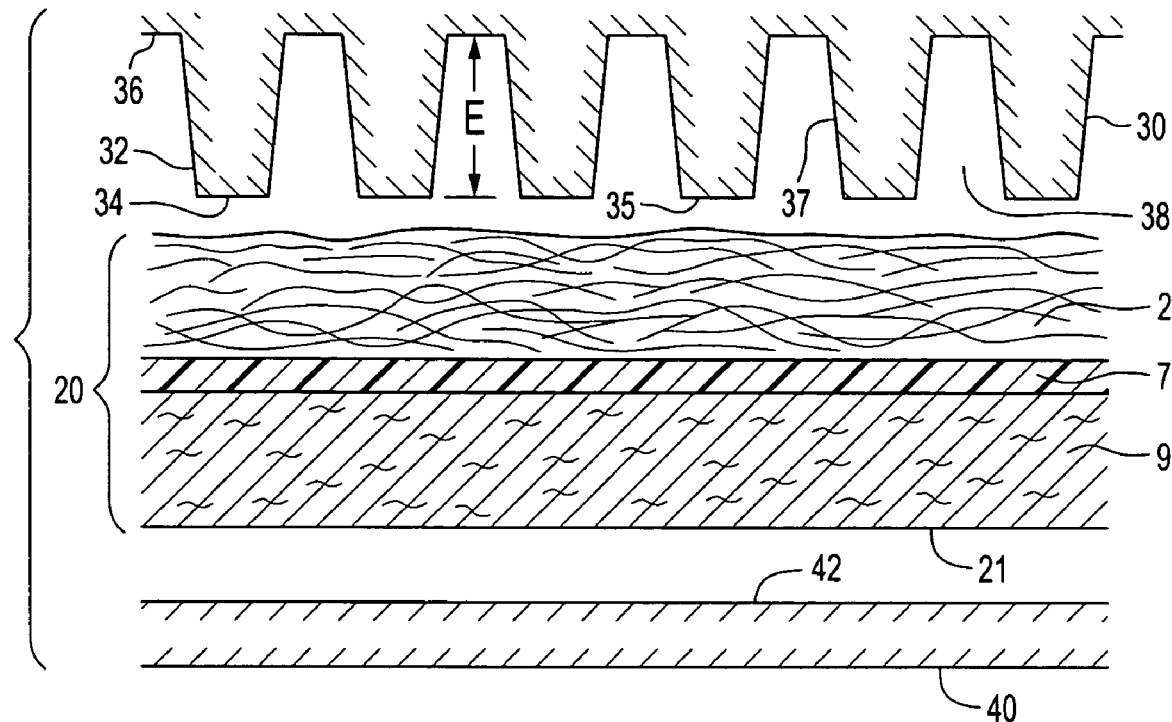
FIG. 7 is cross-sectional view of a portion of a fabrication system suitable for embossing and/or laminating a textured composite material according to an embodiment of the present invention.

Salient features of a tool adapted to perform the embossing and laminating process according to the present invention are illustrated in FIG. 7. The figure illustrates in cross-sectional view a portion of a precursor 20 of a three-layer embodiment of the novel textured composite material. The precursor comprises fibrous outer layer 2, adhesive layer 7 and backing layer 9 positioned adjacent each other in the order stated. An embossing tool 30 is positioned with protrusions 32 pointing toward fibrous outer layer 2. A backup tool 40 is disposed at backing layer 9 of the precursor. The backup tool has a flat working surface 42. To produce the three-dimensional textured, laminated product, the embossing tool is heated and the embossing and backup tools are moved toward each other so as to compress the precursor between the tips 34 of protrusions 32 and the face 42 of the backup tool. The method of moving the embossing and backup tools together is not critical. That is, either the embossing tool or the back up tool can be stationary and the other can be moved toward the stationary tool, or both embossing and backup tools can be mobile. In a typical installation, the backup tool is a plate, sheet or drum and the composite 20 is supported by the backup tool with the exposed inner face 21 in contact with working surface 42 of the backup tool. In such installation, the embossing tool 30 is a roll that rotates so as to force protrusions 32 into the fibrous outer layer and adhesive layers of the supported composite. Other conventional embossing machinery configurations can also be utilized.

The apparatus is set to provide a specified clearance at point of closest approach between the tips 34 and the working surface 42. The tools are held at this clearance dimension for a predetermined duration effective to create the three-dimensional texture of the fibrous outer layer and to laminate the composite layers. Then the tools are moved apart to release the textured product.

Protrusions 32 are spaced apart at positions on base 36 of the embossing tool corresponding to locations of desired depressed areas in the finished composite. The protrusions extend from the base toward the composite by a distance E. This distance and the clearance are sized and dimensioned to provide a desired penetration of protrusions 32 into the precursor such that the adhesive of layer 7 is activated at the protrusion tips. The fibers are simultaneously pushed into the activated adhesive by tips 34, thus anchoring the fibers within the depressed areas. Compression of the composite between the tips and the working surface causes adhesive to laminate the backing layer to the depressed areas which themselves anchor the fibrous outer layer. Distance E is also selected to assure that fibers and adhesive in the voids 38 between protrusions 32 do not excessively overheat and fuse together. Protrusions 32 can have sides 37 that align normal to the plane of the composite. As seen in FIG. 7, the protrusions preferably have tapered profiles that narrow away from the base 36 and render the protrusion frustoconical or truncated pyramidal in form. The tapered geometry facilitates the formation of adhesive clusters 10 that extend outward and upward from depressed areas 5 and which orient fibers of fibrous outer layer 2 in elevated areas 4 in a substantially z-direction as discussed above.

The tips 34 of the protrusions can have a variety of shapes. For example, they can be convex curved that tend to form crater-shaped depressed areas. Convex curved tips also facilitate formation of adhesive cluster fibers at the edges of the depressed areas and promote the z-direction orientation of the fibers in elevated areas 4. The tips can be shaped with cutting surfaces at the tip edges 35. Additionally, the tips can be sharply pointed or concave shaped. These configurations can facilitate perforation of the adhesive layer and sculpting of the backing layer as described below.

Figure 8:
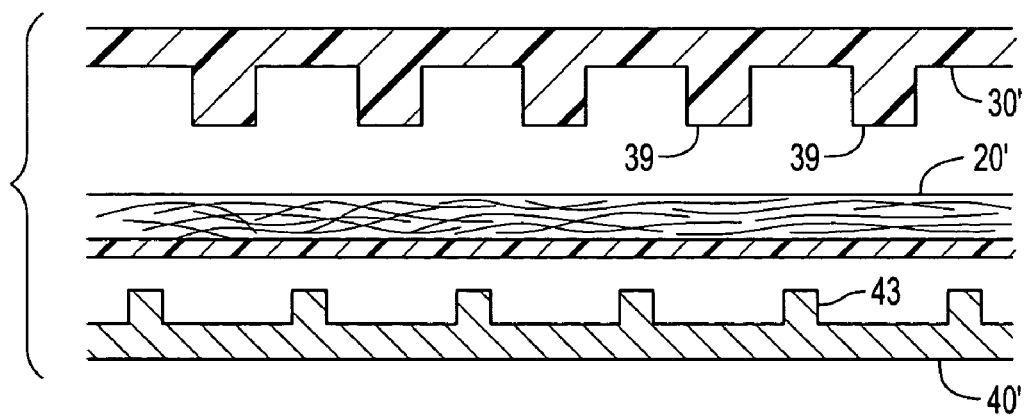
FIG. 8 is a cross-sectional view of a portion of another fabrication system suitable for embossing and/or laminating a textured composite material according to an embodiment of the present invention.

In order to create an undulating reverse side 15 of a two-layer composite (FIG. 2) or a three-layer composite having a thin backing layer, it can be helpful to provide a working surface on the backup tool that mates with the protrusions of the embossing tool in a complementary fashion. FIG. 8 schematically illustrates such a combination of embossing tool 30' and backup tool 40' which are juxtaposed on opposite sides of a two-layer composite precursor 20'. The backup tool has projections 43 which are so positioned as to bias against the reverse side of precursor laterally between the protrusions 39 of the embossing tool 30'. An undulating reverse side profile can alternatively be formed by using a flat working surface 42 (FIG. 7) provided that the working surface is composed of an elastically deformable substance such as rubber. Thus by appropriately adjusting the clearance between the embossing and backup tools, the protrusions of the embossing tool can force the composite into temporary depressions in the deformable backup tool during the embossing step. When the embossing tool retracts after embossing, the elastically deformable working surface of the backup tool recovers to its flat configuration while the composite retains its undulating profile such as seen in FIG. 2.

The embossing tool and/or the backup tool are maintained at a suitable elevated temperature such that the adhesive activates when touched by the tips of the embossing tool protrusions. However, the thermal processing equipment should not be heated to temperatures that approach the fusion point of the outer layer fibers. Such overheating can cause the fibers in the elevated areas to bond to themselves or deteriorate to an extent that the three-dimensional texture of the outer layer is lost. In contemplated variations of the process heat can be supplied from other sources in addition to the embossing tool. For example, the backup tool can be heated, or supplemental heat can be supplied from radiation or heated gas or heated surfaces impinging on the stacked layers prior to embossing. Preheating is preferably performed in a way that raises the temperature of the face layer, adhesive layer and backing layer, if any, to the highest level permissible by the shrinking or melting points of the components.

Prior to embossing, some heat and pressure can be applied to pre-combine the two or three layers, followed by the actual embossing step. During the pre-combining step, care should be used not to penetrate the entire face layer with adhesive and not to increase the density of the face layer excessively. For example, the adhesive layer can be pre-tacked by heat to the backing layer or alternatively to the face layer. Also, the adhesive layer can be needle-punched into the backing layer or alternatively to the face layer.

The operating variables such as temperature, exposure time, pressure, and depth of protrusions can be adjusted to control the degree to which adhesive melts and penetrates between fibers. Thus, when a thermoset adhesive is utilized, heat to activate the adhesive is applied during the embossing step for a time and a temperature selected to prevent this adhesive from setting before embossing is completed. When a thermoplastic adhesive is used, warping of the finished product is avoided by causing the textured composite to cool in a flat orientation.

The tip extension dimension E should be long enough that the protrusion tips extend through the uncompressed fibrous outer layer and contact the adhesive layer without causing heat from the base of the embossing tool to melt the fibrous material, activate low-melting components of the fibrous layer or otherwise thermally agglomerate or degrade the fibers in the elevated areas of the outer layer.

In accordance to an embodiment of the present invention, the protrusions of the embossing tool extend far enough that they penetrate through the adhesive layer and into the backing layer. This has the effect of pushing the depressed areas into the backing layer and compressing the backing layer beneath the depressed areas as seen in FIG. 5.

In another embodiment, central portions of the depressed areas are pushed aside by the embossing tool. This effect can be achieved by raising the temperature of the protrusion tips, forcing the protrusions deeper into the backing layer, providing protrusion tips with sharp cutting edges, using a compliant backup tool surface, and combinations of these techniques. A compliant back up tool can be formed from a suitably resilient, thermally stable material such as a silicon rubber. For example, embossing tool 90 shown in FIGS. 9 and 13 can be used with compliant back up tool 52, 54 shown in FIG. 13. With central portions pushed aside, the outer surface of the textured composite material has elevated areas, ring-shaped depressed areas and exposed areas of backing layer material within the depressed areas.

In still another embodiment, the protrusions extend completely through the backing layer and other optional layers so as to effectively perforate the textured composite.

By causing the protrusion tips to penetrate the backing layer to various depths, diverse color effects can be given to the finished composite. If the backing layer has a color that contrasts with the color of the fibrous outer layer, the contrasting color will show through the depressed areas to the top surface of the composite. More complex color patterns can be obtained by providing multiple strata 9', 9'' and 9''' within the backing layer 9, shown in FIG. 3, or multiple backing layers, each of which have different colors. The fabrication process discussed above can cause the composite to exhibit a wide variety of different color patterns by selecting embossing protrusions that penetrate into different colored strata at correspondingly different depths.

The thermal embossing and laminating operation can be carried out batchwise, for example, using a platen press. This technique is useful for forming piece work textured composite such as sheets, panels and tiles. Alternatively, the heat embossing operation can be conducted in conventional continuous embossing equipment. For example, continuous embossing units provide for moving long webs of fibrous material, adhesive film and backing material simultaneously into the nip between constantly rotating embossing and back up rollers or belts. The rollers and belts are controlled to desired temperatures by conventional heating.

The novel textured composite materials are useful for covering environmental surfaces such as floors, walls, furniture and decorative objects. The three-dimensional texture of the fibrous outer layer provides an economical, abrasion resistant, dust-blocking fabric with a textile feel that can be made to simulate the appearance of loop-pile structures. With optional backing layer the composite has excellent cushioning characteristics and stability to thermal and humidity gradients, which render it well suited for many carpet applications. Inclusion of an optional breathable layer additionally provides excellent ventilation through the textured composite while maintaining impenetrability to liquids. Thus the novel textured composite material can attractively cover and protect its underlying substrate from adverse effects of liquid spills.

EXAMPLES

The present invention is now illustrated by examples of certain representative embodiments thereof, wherein all parts, proportions and percentages are by weight unless otherwise indicated. All units of weight and measure not originally obtained in SI units have been converted to SI units.

Example 1

Textured composite material according to an embodiment the present invention was prepared.

A series of textured composite materials was prepared using the following component materials. The fibrous outer layer was a needle-punched felt fabric made by carding and cross-lapping a 0.19 kg/m$^2$ (5.5 oz/yd$^2$) weight, 2.2 mm thickness felt of 3.8 cm (1.5 inch.) $1.7 \times 10^{-7}$ kg/m (1.5 denier) polyester fibers. Needling density was 46.5 penetrations/cm$^2$ (300 pen/inch$^2$). The adhesive layer material was a combination of two layers of black polyethylene utility film having a basis weight of 0.15 kg/m$^2$ (4.4 oz/yd$^2$). The backing layer was commercial carpet padding material of 0.88 kg/m$^2$ (26 oz/yd$^2$) of carded lapped fibers comprising 50% polyamide/ 50% polypropylene post consumer carpet waste. The fibers were garnetted, cross-lapped, and needled to form a backing layer having a thickness of 12.3 mm.

Figure 9:
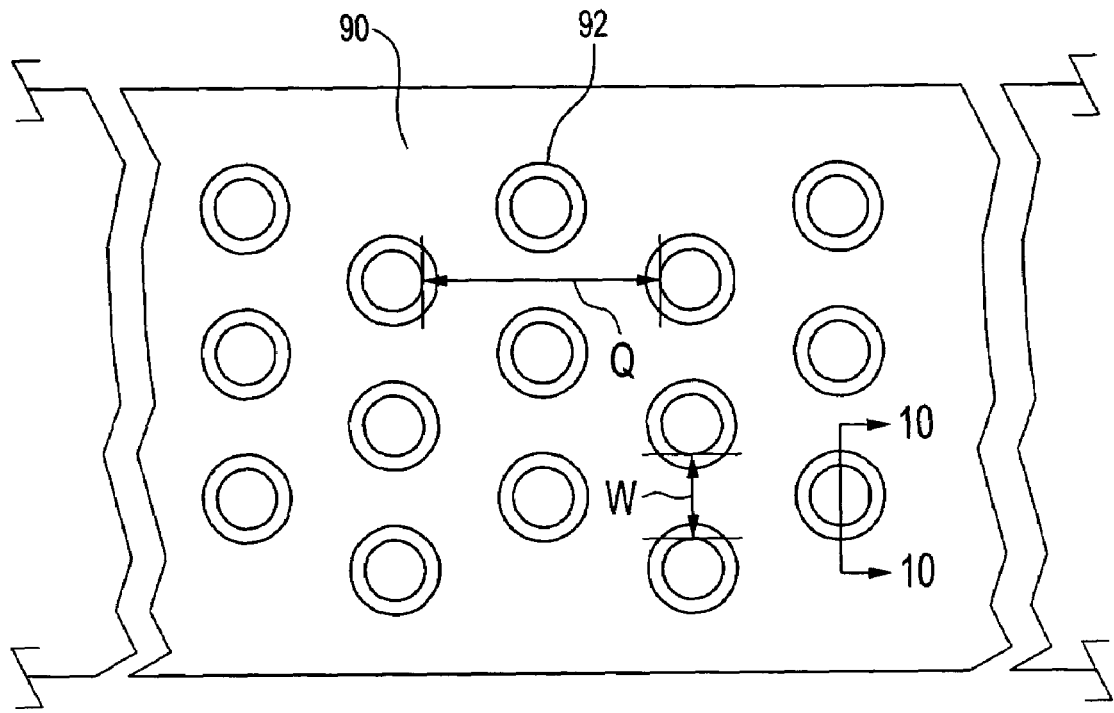
FIG. 9 is a top view of a portion of an embossing tool suitable for use with the present invention.
Figure 10:
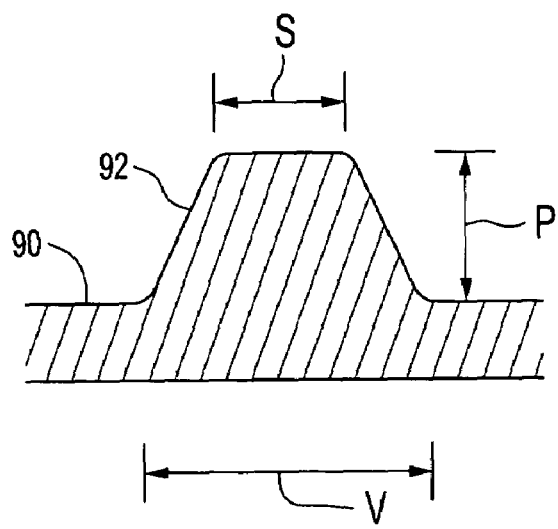
FIG. 10 is a cross-sectional view of a protrusion of the embossing tool of FIG. 9 as viewed along line 10-10.

The composite material was formed by stacking in top-to-bottom order, the outer layer, adhesive layer and backing layer materials in a platen press. The press was equipped with a nickel upper embossing plate and a lower support plate. A diagram of a portion of the upper plate 90 is shown in FIGS. 9 and 10. The upper plate had frusto-conical protrusions 92 as shown in FIG. 10 and arranged in a staggered pattern as shown in FIG. 9. Dimensions and spacing of the protrusions were as follows: S=2.0 mm, P=1.5 mm, V=2.5 mm, Q=5.2 mm, and W=1.6 mm.

Pressure of 20.7 MPa (3000 psi) was applied to the platens by raising the bottom plate for a short time and then quickly lowering the bottom plate to allow cooling. Plate temperature, press time and other conditions utilized are presented in Table I.

TABLE I

| Ex. | Emboss Plate Temp. °C. | Backup Tool Temp. °C. | Time Sec. | Composite Thickness mm | Elevated area Thickness $T_f$ mm | Distance D mm | Ratio $D/T_f$ | Comment |
| --- | --- | --- | --- | --- | --- | --- | --- | --- |
| 1A | 220 | 25 | 0.5 | 10 | 0.8 | 1.27 | 1.6 | Soft cushion feel similar to dense tufted carpet. Gray colored depressions |
| 1B | 220 | 25 | 1.0 | 6.4 | 0.7 | 1.40 | 2.0 | Slightly stiff feel. Dark gray colored depressions. |
| 1C | 220 | 25 | 2.0 | 2.5 | 0.6 | N.M.* | N.M* | Stiff feel, similar to dense vinyl tile. Perforated. |

N.M.* = Not measured

Samples 1A-1C demonstrate that the texture and feel of a three-component composite can be manipulated by duration of embossing. In this progression of samples, the embossing time was increased. As a result, the thickness of the completed composite was reduced and the feel became increasingly stiffer. Within the depressed areas (Ex. 1A) the black adhesive layer began to flow into the interstices between outer layer white fibers and thus produced a gray color. This effect increased in Ex. 1B and made the appearance of the depressed areas darker. The elevated areas remained white. In Ex. 1C the tips of the embossing protrusions penetrated completely through the adhesive layer to the backing layer. Accordingly, the central portions of the depressed areas were completely removed. Partial penetration of adhesive within the elevated areas gave these areas a light gray tone, although no adhesive reached the peak of the elevated areas.

Example 2

Textured composite material having a breathable, i.e., liquid permeation resistant, vapor transmissive barrier layer was produced.

Samples of textured composite material were prepared from the following materials. The fibrous outer layer was composed of 0.14 kg/m² (4.2 oz./sq. yd.) weight Xymid® Style 1817 stitch bonded fabric (Xymid LLC, Petersburg, Va.). This fabric comprises Reemay® spunbonded polyester style 2024 which had basis weight of 0.07 kg/m² (2.1 oz./sq. yd.) and which was chain-stitched with 3.54 stitches per cm (9 counts per inch) of 14 gauge textured nylon yarn. This fabric is easily deformable at temperatures over 100° C. The stitches of textured nylon yarn are stretchable by at least 50% elongation with or without application of heat.

The adhesive in Example 2A was Griltex-4 polyamide powder (EMS Company, Switzerland) of 200-500 μm particle size and having a melting point of 105° C. The powder particles were deposited at a density of 0.051 kg/m² (1.5 oz/sq. yd.) on a breathable layer of a web of meltblown polypropylene microfibers. The powder was sifted onto the web without infiltrating the web, and thereby, not blocking the breathable layer. The microfiber web consisted of about 0.6 to about 0.1 denier fibers and has a basis weight of about 3 oz/yd² available from Mogul Fabrics (Gaziantep, Turkey). The backing layer was the same as that in Example 1.

The materials were assembled and processed as described in Example 1 with exceptions that will be noted. The operating conditions and results are shown in Table II. The pressure of the platen press during embossing was 13.8 MPa (2000 psi). The structure of the composite was as shown in FIG. 6.

layers. In the elevated areas, the powdered adhesive melted partially and penetrated the outer fibrous layer without reaching the upper surface of the fibrous outer layer. Despite this partial penetration, the breathable layer remained vapor permeable. Breathability was determined by providing a Mason jar having a two-part lid formed by a peripheral screw top and a removable flat disk. The disk was perforated. With the lid removed, 5 g of water was placed in the jar. A 7.6 cm (3 inch) diameter sample of the composite was then laid on the perforated disk and the peripheral portion of the top was screwed onto the jar over the disk/sample, thereby sealing the sample over the mouth of the jar. The jar was maintained at room temperature for 72 hours and the difference in weight before and after the test was measured. A weight loss of 0.1 g was deemed evidence that the sample permeated water vapor and was therefore breathable. A weight loss of 0.7 g was observed for sample 2A.

Although permeable to vapor, the sample was resistant to water flow through the composite. Water flow resistance was determined by placing an approximately 2.54 cm (1 inch) diameter sample piece to be tested against the rubber washer in a 1.9 cm (¾ inch) diameter female connector of a common garden hose. A male garden hose connector attached to a section of hose was screwed into the female connector which clamped the sample across the lumen and thus to block flow through the hose. The assembled apparatus was oriented vertically and a 25.4 cm (10 inch) high column of water was placed in the hose on top of the sample. The apparatus was positioned over a sheet of dry blotting paper. The sample was deemed to be impenetrable to liquid if the sheet was dry after 0.5 hour of testing.

Alternatively, the liquid impermeable layer can also be gas impermeable.

Example 2B repeated 2A except that the polyamide adhesive powder was eliminated and two layers of the polypropylene fiber web of total weight of 0.20 kg/m² (6 oz./sq. yd.) were used. Also the upper platen plate temperature was increased to 220° C. The fibrous outer layer was well bonded to the polypropylene breathable layer and the textured composite exhibited good delamination resistance by peel testing, i.e., the composite separated within layers but not at the interface between layers when pulled apart by hand. This demonstrates that the breathable layer can also serve the purpose of the adhesive layer. The low melting copolymer of the Reemay fabric was fully fused in the depressed areas and the fabric maintained its original fiber form with no evidence

TABLE II

| Ex. | Emboss Plate Temp. ° C. | Backup Tool Temp. ° C. | Time sec. | Composite Thickness mm | Elevated area Thickness $T_f$ mm | Distance D mm | Ratio $D/T_f$ | Comment |
|---|---|---|---|---|---|---|---|---|
| 2A | 170 | 25 | 0.5 | 11.4 | 0.95 | 1.27 | 1.3 | Full bonds in depressed areas, partial bonds in elevated areas |
| 2B | 220 | 25 | 0.5 | 11.4 | 0.80 | 1.27 | 1.6 | Full bonds in depressed areas, no bonds in elevated areas |
| 2C | 220 | 220 | 0.5 | 12.7 | 0.80 | 1.27 | 1.6 | Full bonds in depressed areas, no bonds in elevated areas |

In Ex. 2A well formed bonds in the depressed areas were evident. The composite was sufficiently well laminated that the layers could not be peeled apart without destroying the of melting or shrinking in the elevated areas. Liquid penetration and vapor transmission were similar to that seen in Ex. 2A.

Example 2C was conducted identically to Ex. 2A except that a web of 2.5 cm long Type K glass staple fiber was added to the underside of the backing layer, and the bottom platen plate was heated to 220° C. The finished composite of Ex. 2C was similar in appearance to that of Ex. 2B.

Rigidity and dimensional stability tests were performed on Exs. 2B and 2C by the following methods. Rigidity was determined by cutting a 2.54 cm×20.3 cm (1 inch×8 inch) strip from a sample of the composite to be tested. The strip was clamped to a horizontal surface, such as a table top, in a way that about 5 cm (2 inches) of the sample overlapped the surface and the remaining about 15 cm (6 inches) extended freely beyond the surface in cantilever fashion. The vertical deflection at the free end of the sample, i.e., the vertical distance of that the end drooped below the elevation of the horizontal surface was measured. Ex. 2B had a rigidity deflection of 5 mm and exhibited doming of 3-4 mm and cupping of 1-2 mm. Ex. 2B had a rigidity deflection of 2 mm and approximately zero doming and cupping. Retesting all Examples 2A, 2B and 2C showed negligible doming or cupping. This was attributed to relaxation of stresses with time versus the first tests conducted immediately after lamination.

Example 3

Multiple stage embossing is used to produce a varied color composite material.

Materials used to produce composite materials were as follows. The fibrous outer layer was white Reemay® type 2040 polyester spunbonded fabric, basis weight 0.14 kg/m² (4 oz./sq. yd.). This fabric is thermally moldable above 100° C. The adhesive was the same as that in Ex. 1. The backing layer was a 0.68 kg/m² (20 oz./sq. yd.) resilient felt formed from carded, cross-lapped and needle-punched polyester staple fiber at 23.2 penetrations/cm² (150 pen./inch) per side using 7.6 cm long 16.6×10⁻⁷ kg/m (15 denier) per filament. The backing layer was about 0.95 cm (⅜ inch) thick. This backing layer material was stained red by contacting one side with a commercial red dye dissolved in water and then dried in and oven at 130° C. to set the dye. The dye penetrated to about one third of the thickness of the layer. The same staining procedure was performed on the opposite side of the backing layer using a dark green colored dye.

Figure 11:
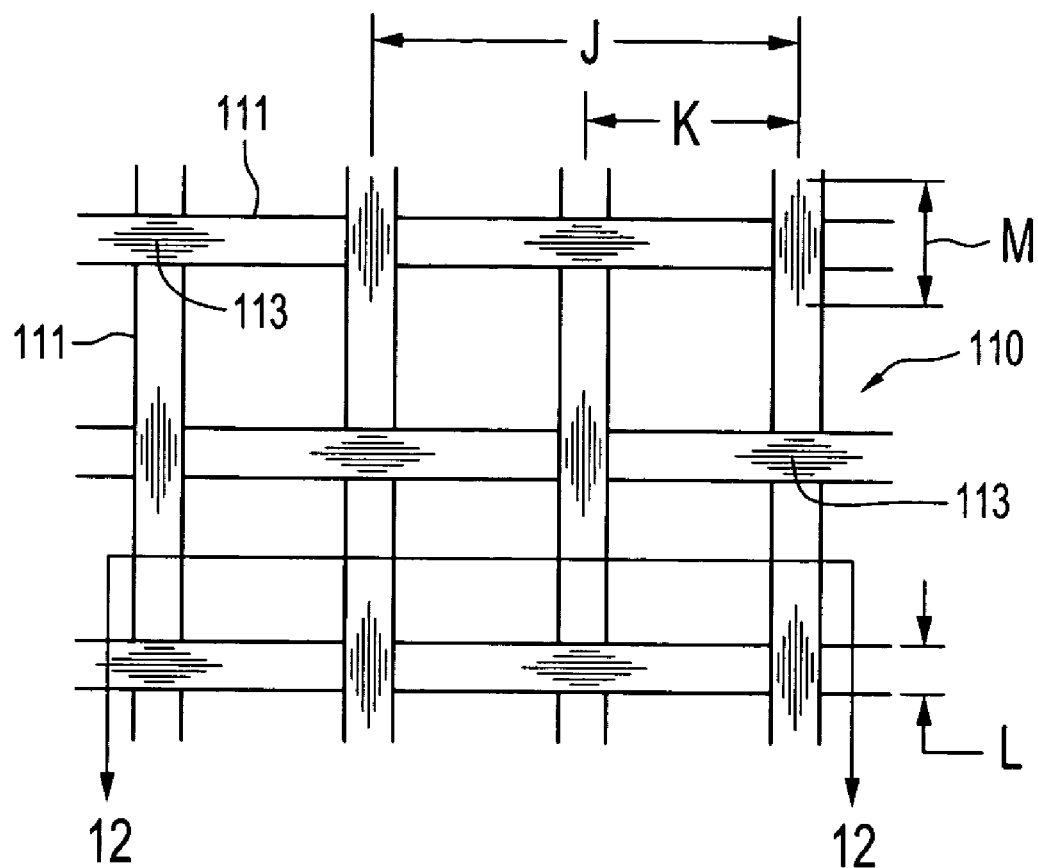
FIG. 11 is a top view of a portion of a wire mesh embossing tool suitable for use with the present invention.
Figure 12:
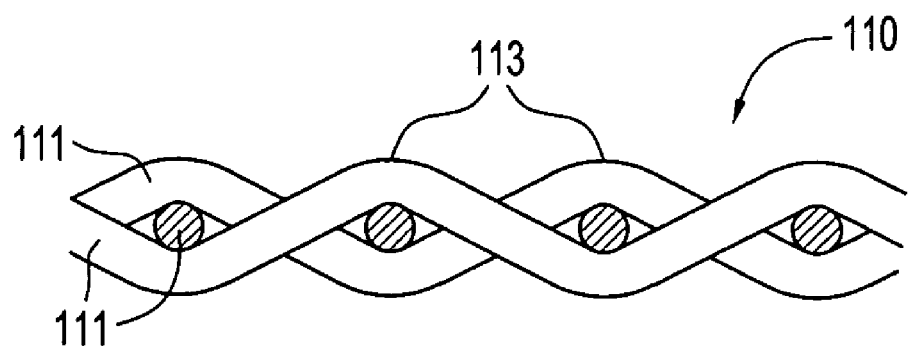
FIG. 12 is a detail cross-sectional view of the wire mesh embossing tool shown in FIG. 11 as viewed along line 12-12.

The composite structure was assembled in the platen press as in the previous examples except that three patterning plates were provided. Plate A had 30 round protrusions per cm² (196/sq. inch.), and is further defined by the values for pattern dimensions in FIGS. 9 and 10 as follows: Q=2.6 mm, W=0.8 mm, S=1 mm, V=1.25 mm, and P=1 mm (40 mil). Plate B had the same embossing pattern dimensions as in Ex. 1. Plate C, illustrated schematically in FIGS. 11 and 12, was a plain weave metal screen 110 woven from 8 gauge wire 111. The screen 110 had elongated protrusions 113 alternating at 0 and 90 degrees positioned as shown in the figures with dimensions as follows: J=6.35 mm (0.25 inch), K=3.2 mm (0.125 inch), L=1.5 mm (0.06 inch), M=3.0 mm (0.120 inch) and N=2.5 mm (0.10 inch). The composites were formed by pressing the plates together with pressure of 48.2 MPa (7000 psi) at conditions shown in Table III.

The sample of Ex. 3A was first embossed with plate A for 1.5 seconds to produce an intermediate finished composite material with 0.89 mm deep depressed areas. Because of the blending of the fused adhesive with the fibers, the recessed areas took on a gray color while the fibers in the elevated areas remained white. Then the sample was re-pressed for an additional 1.5 seconds with plate B substituted for plate A. This produced a superimposed pattern of deeper depressed areas The protrusions penetrated into the backing layer and exposed dark red color in the more deeply depressed areas while the areas not touched by plate B retained colors produced by the initial pressing. See Table III.

The sample of Ex. 3B was prepared by repeating the two stage pressing procedure of Ex. 3A. Then the sample was re-pressed a third time for 1.5 seconds with plate C in the press. The third pressing formed still more deep depressed areas that penetrated farther into the backing layer and exposed dark brown color where the protrusions of plate C penetrated.

TABLE III

| Ex. | Emboss Plate Temp. ° C. | Backup Tool Temp. ° C. | Time sec. | Plate | Composite Thickness mm | Embossment Thickness $T_f$ mm | Distance D mm | Ratio $D/T_f$ | Comment |
|---|---|---|---|---|---|---|---|---|---|
| 3A | 220 | 25 | 1.5 | A | 8.90 | 0.35 | 0.89 | 2.2 | Depressed areas gray |
|  |  |  | 1.5 | B |  |  | 1.0 | 3.0 | Depressed areas dark red |
| 3B | 220 | 25 | 1.5 | A | 7.6 | 0.35 | 0.76 | 2.2 | Depressed areas gray |
|  |  |  | 1.5 | B |  |  | 1.02 | 3.0 | Depressed areas dark red |
|  |  |  | 1.5 | C |  |  | 1.87 | 6.0 | Depressed areas dark brown |

Example 4

Operating conditions are varied to show that adhesion and textile composite face designs can be affected by suitably adjusting control variables.

For the samples produced in this example, the fibrous outer layer was an upholstery fabric of a blend of 70% nylon and 30% cotton spun yarns with a 7.9 warp/cm×7.9 weft/inch (20×20) weave. The basis weight was 0.41 kg/m² (12 oz./sq. yd.) and thickness was about 1 mm. The adhesive layer was black polyethylene film of basis weight 0.11 kg/m² (3.2 oz./sq. yd.). The backing layer was the same as in Ex. 1. In all samples of Example 4, the embossing plate temperature was maintained at 200° C.

Sample 4A is a comparative example, which was produced using the same platen pressing process as in Ex. 1 with Plate A in the embossing position. Pressing was for a short time and under moderate pressure as presented in Table IV. Although the depressed area fibers anchored well into the adhesive layer, the composite was capable of delamination by hand peel test without excessively tearing up the surface of the backing. Sample 4B repeated the procedure of sample 4A except that the underside of the fibrous outer layer was manually sanded with about 10 reciprocating strokes using 60-grit sandpaper such that the surface was roughened. After pressing, the composite had the same good bulk and appearance characteristics as sample Ex. 4A and the backing layer could not be delaminated from the outer and adhesive layers without seriously damaging the outer layer or the backing layer.

To make sample 4C, Ex. 4A was repeated but deeper penetrating plate B was utilized. Thus the depressed areas anchored the outer layer more deeply into the composite than Ex. 4A. Without roughening the underside of the outer layer starting material, the composite had good cohesive strength to withstand delamination. That is, it could not be delaminated without damaging the outer or backing layers.

Ex. 4D was performed using the shallower protrusions of plate A and without sanding the underside of the outer layer before pressing. However, the press pressure was increased and the support plate was heated. This product did not delaminate without damaging the outer or backing layers.

In Example 4E the adhesive layer was eliminated. To compensate for lack of an independent adhesive layer, the deeper penetrating embossing plate (plate B), high pressure and longer pressing time were used. These conditions were sufficient to cause the polypropylene fibers within the backing layer to bond the fibers of the fibrous outer layer within the depressed areas. This product did not delaminate.

As shown, the orientation of the composite and the embossing tool is reversed to the orientation shown in other Figures. The present invention covers any orientation during the manufacturing process, and the present invention is not limited to any orientation shown herein. The optional backing layer is omitted in this Example.

Fibrous outer layer 2 was a nonwoven fabric made from carded and cross-lapped 1.5 denier/1.5 inch semi-dull staple polyester fibers and needle-punched with a relatively high needling density of about 155 penetrations per square centimeter (or 1000 penetrations per square inch). This needling density was significantly higher than the needling density of the fibrous outer layer in Example 1.

Adhesive layer 7 was a black polyethylene film. Two basis weights of the adhesive layer, 0.6 oz/sq. yd and 2.0 oz/sq. yd., were used.

The embossing plate of Example 1 having depth of protrusion P of 1.5 mm was also used to prepare samples for this Example, except that the embossing plate 90 was mounted on the bottom press platen 50. The upper press platen 52 had a silicon rubber sheet 54 mounted on its surface. Two rubber sheets, 1 mm thick and 2 mm thick, were used. The bottom platen was heated to about 220° C. and the upper platen was unheated and kept at about 25° C. The fibrous outer layer was

TABLE IV

| Ex. | Plate | Emboss Pressure MPa | Backup Tool Temp ° C. | Time sec. | Composite Thickness mm | Embossment Thickness $T_f$ mm | Distance D mm | Ratio $D/T_f$ | Comment |
|---|---|---|---|---|---|---|---|---|---|
| 4A | A | 20.7 | 25 | 0.5 | 10.2 | 0.5 | 0.76 | 1.52 | Delaminated |
| 4B | A | 20.7 | 25 | 0.5 | 10.2 | 0.5 | 0.76 | 1.52 | Not Delaminated |
| 4C | B | 20.7 | 25 | 0.5 | 10.2 | 0.5 | 1.29 | 2.58 | Not Delaminated |
| 4D | A | 138 | 220 | 0.5 | 7.6 | 0.4 | 0.89 | 2.22 | Not Delaminated |
| 4E | B | 138 | 220 | 1.5 | 5.1 | 0.4 | 1.40 | 3.50 | Not Delaminated |

Example 5

Figure 13:
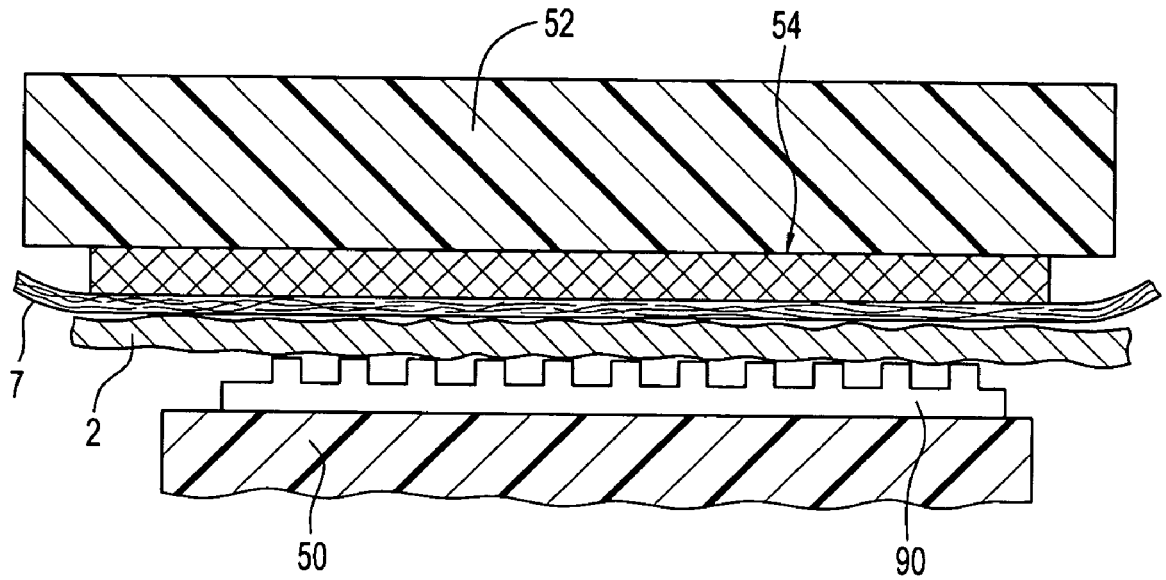
FIG. 13 is a cross-sectional view of a portion of a fabrication system suitable for embossing and/or laminating a textured composite according to an embodiment of the present invention.

Textured composite materials according to an embodiment the present invention were prepared, as illustrated in FIG. 13.

positioned to be contacted by the heated bottom platen and the adhesive layer was positioned to be contacted by the unheated upper rubber platen. Pressure of about 3,000 psi was applied to the platens.

TABLE V

| Ex. | Adhesive Film (oz/yd$^2$) | Time (sec) | Rubber Backup Tool (mm) | D (mm) | $T_f$ (mm) | Ratio $D/T_f$ | Y (mm) | Density Y (g/cm$^3$) | Comment |
|---|---|---|---|---|---|---|---|---|---|
| 5A | 0.6 | 0.5 | 2 | 1.1 | 0.8 | 1.4 | 0.25 | 0.8 | Adhesive anchored but did not fully embed fibers in depressed areas. Good surface stability. |
| 5B | 0.6 | 1.0 | 2 | 1.2 | 0.7 | 1.7 | 0.20 | 1.0 | Similar to Ex. 5A with less flexibility. |
| 5C | 0.6 | 2.0 | 2 | 1.3 | 0.6 | 2.2 | 0.20 | 1.0 | Molten adhesive pushed through the depressed areas, turning these areas gray. Good surface stability. |
| 5D | 2.0 | 2.0 | 2 | 1.4 | 0.7 | 2.0 | 0.25 | 1.0 | Molten adhesive pushed through the depressed areas. Activated adhesive partially bonded with the surface of the fibrous outer layer under elevated areas. |

TABLE V-continued

| Ex. | Adhesive Film (oz/yd²) | Time (sec) | Rubber Backup Tool (mm) | D (mm) | $T_f$ (mm) | Ratio $D/T_f$ | Y (mm) | Density Y (g/cm³) | Comment |
|---|---|---|---|---|---|---|---|---|---|
| 5E* | 2.0 | 3.0 | 2 | 1.4 | 0.5 | 2.8 | 0.20 | 1.3 | COMPARATIVE. Molten adhesive penetrated throughout the outer layer. |
| 5AA | 0.6 | 0.5 | 1 | 1.0 | 0.9 | 1.1 | 0.25 | 0.8 | Similar to Ex. 5A, except that the adhesive film shrunk and broke apart under elevated areas. |
| 5BB | 0.6 | 2.0 | 1 | 1.1 | 0.8 | 1.4 | 0.20 | 1.0 | Similar to Ex. 5AA. |
| 5DD | 2.0 | 2.0 | 1 | 1.3 | 0.8 | 1.6 | 0.20 | 1.3 | Similar to Ex. 5D, except that there was no partial bonding under the elevated areas. |
| 5EE | 2.0 | 3.0 | 1 | 1.4 | 0.8 | 1.3 | 0.20 | 1.3 | Similar to Ex. 5DD, except that longer time duration |

Fibrous outer layer 2 was embossed with the embossing platens of this Example using either of the rubber sheets on the back up tool. While the fibrous outer layer was embossed without the adhesive, the embossed layer had limited surface stability, and fibers could be readily raised from the surface by hard hand rubbing.

In Ex. 5A, within the depressed areas of the composite the fibers were well anchored in the adhesive layer, without being fully embedded therein as illustrated by reference number 56 in FIG. 14. The top 58 of elevated areas remained white indicating that the black adhesive had not been pushed through the white outer layer. Within the elevated areas, the elevation distance, D, was 1.1 mm and the thickness of the fibrous layer, $T_f$, was 0.8 mm. Hence the ratio of $D/T_f$ is greater than 1.25, indicating that the two-layer composite of this Example has an undulating shape, as shown in FIG. 14. Furthermore, the adhesive layer under the elevated areas was loose or unattached to the outer layer, as shown by reference number 60. The composite sample was surface stable, soft and flexible, and the fibers would not be raised by hand-rubbing. The thickness of the depressed areas "Y" was 0.25 mm, leading to a calculated density of the depressed areas being about 0.8 gram/cm³.

Ex. 5AA was prepared similarly as Ex. 5A, except that the thinner silicon rubber sheet (1 mm) was used. The composite sample produced was well embossed with slightly less depth D and higher bulk in the elevated areas. The adhesive film under the elevated areas shrunk and broke apart as illustrated by reference number 62.

Ex. 5B was prepared similarly as Ex. 5A, except that duration that the embossing tool applies heat and pressure to the precursor was longer. The composite sample produced was embossed deeper (D=1.2 mm) and had less bulk ($T_f$=0.7 mm) in the elevated areas. The depressed areas were thinner and denser. The molten adhesive remained below the surface of the composite and the top surface of the composite remained white. The sample was somewhat less flexible than Exs. 5A and 5AA, but was still very soft and surface durable.

Ex. 5BB was similarly prepared as Ex. 5B, except that the thinner silicon rubber sheet (1 mm) was used and the time duration was longer. The composite sample produced was similar to Ex. 5B, but with slightly shallower depth D and the adhesive film under the elevated areas shrunk and broke apart as illustrated by reference number 62.

Ex. 5C was similarly prepared as Ex. 5B, except that the time duration is longer. The composite sample produced was similar to Ex. 5B, except that the molten adhesive penetrated through the depressed areas turning the depressed areas gray as illustrated by reference number 64. The sample had good surface stability.

Ex. 5D was similarly prepared as Ex. 5C, except that the thicker adhesive film was used. Same result was produced as Ex. 5C. The adhesive was partially bonded with the surface of the outer layer under the elevated areas as illustrated by reference number 66. The outer surface of the elevated areas remained free of activated adhesive and soft.

Ex. 5DD was similarly prepared as Ex. 5D, except that the thinner silicon rubber sheet (1 mm) was used. The thinner rubber allowed the heavier adhesive film to remain un-bonded to the surface of the fibrous outer layer as illustrated by reference number 60.

Ex. 5EE was similarly prepared as to Ex. 5DD, except that longer time duration allowed partial bonding under the elevated areas as illustrated by reference number 66. In FIG. 14, the outer surface of the elevated areas remained free of activated adhesive and soft.

Ex. 5E* was the comparative example and outside of the present invention. Due to thicker adhesive, longer duration and thicker rubber backing tool, the molten adhesive flowed through the fibrous outer surface.

In all the inventive examples except comparative example 5E*, the exposed fibers in the elevated areas were free of activated adhesive. Preferably, depth D exceeds thickness $T_f$, and the density of the depressed areas exceeds 0.7 gram/cc. The molten adhesive penetrated through the depressed areas in some cases but not in other cases. All inventive samples are surface stable and have soft textile feel.

Example 6

Optional backing layer 9 is added to any of the inventive examples illustrated in Example 5. More specifically, the optional third backing layer is a needled batt topped with an adhesive film integrated into the batt during the manufacturing process.

Fibrous outer layer 2 is a nonwoven fabric made from carded and cross-lapped 1.5 denier/1.5 inch white staple polyester fibers and needle-punched with a relatively high needling density of about 155 penetrations per square centimeter (or 1000 penetrations per square inch) on both sides for more durability. The basis weight is about 5.5 oz/sq. yd. and thickness is about 0.8 mm.

Adhesive layer 7 is a polyethylene film having a basis weight of about 2 oz/sq. yd.

Backing layer 9 is a blend of 65% of 15 denier per filament/3 inch polyester staple fibers, and 35% of 2 denier per filament/1.5 inch polypropylene staple fibers. The blend is carded, cross-lapped and mechanically needled from one face with about 62 penetrations per square centimeter (or 400 penetrations per square inch) onto the adhesive film. The total basis weight is about 24 oz/sq. yd, including the film. It is noted that the finer polypropylene fibers were pushed through the thickness of the backing in large numbers creating a "furry" surface over the adhesive film. The coarser and tougher polyester fibers stayed mostly within the plane of the backing.

Figure 15:
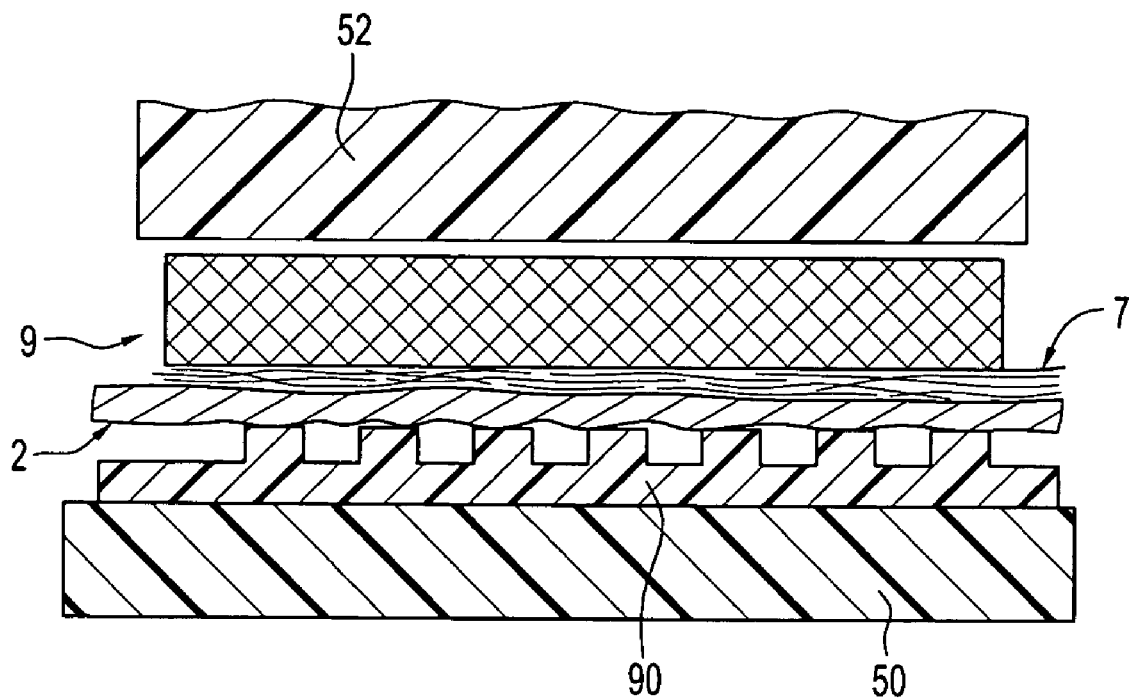
FIG. 15 is a cross-sectional view of a portion of a fabrication system suitable for embossing and/or laminating a textured composite according to an embodiment of the present invention.

As shown in FIG. 15, the embossing plate of Example 1 having depth of protrusion P of 1.5 mm is also used in this Example, except that the embossing plate 90 is mounted on the bottom press platen. Bottom platen 50 is heated to about 220° C. and upper platen 52 is heated to about 180° C. Fibrous outer layer 2 is positioned to be contacted by the heated bottom platen and backing layer 9 is positioned to be contacted by the heated upper platen to stabilize the back side of the batt. Pressure of about 3,000 psi was applied to the platens. As illustrated in FIG. 16, Z is the thickness of the skin on the back side or bottom of the backing layer formed by one of the heated platens, and Tall is the total thickness of the composite measured from a peak on an elevated area to the skin on the bottom of the backing layer. Y is the depth of adhesive penetration within the depressed areas (see page 9). The density of Y (last column) is calculated using this thickness and the combined weight of fibrous layer and adhesive layer. The presence of backing, if any, within this thickness Y is ignored in this calculation.

Ex. 6D was the comparative example and was exposed to the longest to heat and pressure. Activated adhesive penetrated through most of the fibrous outer layer. This comparative example is outside of the present invention.

Although specific forms of the invention have been selected for illustration in the drawings and the preceding description is drawn in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. A textured composite material having a surface area and comprising a continuous or integral fibrous outer layer and a contiguous adhesive layer, wherein the continuous or integral fibrous outer layer is formed from a fabric that is initially arranged substantially parallel to the contiguous adhesive layer, wherein the surface area comprises depressed areas and elevated areas, wherein the fibers of the fibrous outer layer in the depressed areas are anchored in the adhesive layer and wherein at least some of the fibers on the outer surface of the fibrous outer layer in the elevated areas are unbonded to the adhesive layer, wherein after the depressed and elevated areas are formed the fibrous outer layer and the top and bottom surfaces of the adhesive layer are non-planar and follow substantially the same contour, wherein a combined density of the fibrous outer layer and the adhesive layer in the depressed areas is at least about $0.7 g/cm^3$,

TABLE VI

| Ex. | Time (sec) | D (mm) | $T_f$ (mm) | Y (mm) | S (mm) | $T_{all}$ (mm) | Ratio $D/T_f$ | Density Y ($g/cm^3$) | Comment |
|---|---|---|---|---|---|---|---|---|---|
| 6A | 0.5 | 1.2 | 0.6 | 0.30 | 0.2 | 8.0 | 2.0 | 0.85 | Adhesive did not penetrate through the depressed areas. Adhesive film remained unattached to the outer layer under the elevated area. Composite is surface durable and has soft feel. |
| 6B | 1.0 | 1.3 | 0.6 | 0.25 | 0.3 | 4.0 | 2.2 | 0.93 | Similar results as Ex. 6A. |
| 6C | 2.0 | 1.4 | 0.5 | 0.20 | 0.3 | 2.0 | 2.8 | 1.20 | Adhesive penetrated through the depressed areas. Top of elevated areas remained white. Composite is surface durable and has soft feel. (FIG. 16). |
| 6D* | 4.0 | 1.4 | 0.4 | 0.20 | 0.4 | 2.0 | 2.8 | 1.20 | COMPARATIVE. Molten adhesive penetrated throughout the outer layer. |

In Ex. 6A, heat was applied for a short period of time. The protrusions penetrated 1.2 mm and the fibers were well anchored in the adhesive layer, without being fully embedded therein. The top of depressed areas remained white indicating that the black adhesive had not been pushed through the white outer layer. The adhesive film remained loose or unattached to the outer layer under the elevated areas. The fibers on top of the depressed areas were free of activated adhesive. The composite was surface durable and had a soft feel.

Ex. 6B was prepared similarly to Ex. 6A, except that the time duration under heat and pressure was longer. The composite sample was stiffer than Ex. 6A, and remained soft and surface durable. The adhesive did not penetrate through the depressed area.

Ex. 6C was exposed to heat and pressure even longer. Activated adhesive penetrated through the depressed areas. The elevated areas remained white. The composite sample remained soft and surface durable.

wherein a lateral distance between adjacent depressed areas in at least one direction is from about 1.5 mm to about 10 mm, wherein the elevation of the elevated area, D, is greater than the thickness of fibrous layer, $T_f$, in the elevated area, and wherein the textured composite material is useable as a floor cover.

2. The textured composite of claim 1, wherein the combined density of the fibrous outer layer and the adhesive layer in the depressed areas is at least $1.0 g/cm^3$.

3. The textured composite of claim 1, wherein within the depressed areas the fibers of the fibrous outer layer are substantially embedded in the adhesive layer.

4. The textured composite of claim 1, wherein within the depressed areas all the fibers of the fibrous outer layer are embedded in the adhesive layer.

5. The textured composite of claim 1, wherein within the depressed areas the adhesive layer penetrates through to at least a portion of the top of the fibrous layer.

6. The textured composite of claim 1, wherein within the depressed areas the fibers on the top suface of the fibrous outer layer are unbonded to the adhesive layer.

7. The textured composite of claim 1, wherein within the elevated areas the fibers positioned on the bottom surface ot the fibrous outer layer are bonded to the adhesive layer.

8. The textured composite of claim 1, wherein within the elevated areas the fibers positioned on the bottom surface of the fibrous outer layer are unbonded to the adhesive layer.

9. The textured composite of claim 1, wherein the density of the peak regions ot the elevated areas is substantially the same as the density of the fibrous outer layer.

10. The textured composite of claim 1, wherein a ratio of the elevation of the elevated area, D, to the thickness of fibrous layer, $T_f$, in elevated area is about 2.8 or less.

11. The textured composite of claim 1, wherein said ratio is greater than about 2.0.

12. The textured composite of claim 1, wherein the composite has a reverse side opposite the fibrous outer layer and the reverse side has an undulating profile.

13. The textured composite of claim 1, wherein the fibrous outer layer has a different color than the adhesive layer, such that the surface area of the composite comprises multiple colors.

14. The textured composite of claim 1, wherein the adhesive layer is liquid permeable.

15. The textured composite of claim 1, wherein the fibrous outer layer comprises at least one lace layer.

16. The textured composite of claim 1, wherein the depressed areas comprise a second pattern of spaced apart depressed areas.

17. The textured composite of claim 1, wherein the density of the fibrous outer layer and the adhesive layer in the depressed areas is at least 1.0 g/cm$^3$.

18. The textured composite of claim 17, wherein the density is about 1.3 g/cm$^3$ or less.

19. The textured composite of claim 18, wherein the density is about 1.3 g/cm$^3$.

20. The textured composite of claim 1, wherein the density of the unbonded fibrous outer layer is in the range of about 0.1 g/cm$_3$ to about 0.6 g/cm$^3$.

21. The textured composite of claim 20, wherein the density is about 0.2 g/cm$^3$. g/cm$^3$.

22. The textured composite of claim 1, wherein a ratio of the elevation of the evevated area, D, to the thickness of fibrous layer, $T_f$, in elevated area is at least about 1.25.

23. The textured composite of claim 22, wherein said ratio is greater than about 1.5.

24. The texture composite of claim 1, wherein the surface area further comprises transition areas disposed between the depressed areas and the elevated areas.

25. The texture composite of claim 24, wherein of the fibrous outer layer and the adhesive layer in the transition areas is less than 0.7 g/cm$^3$ and greater than about 0.2 g/cm$^3$.

26. The texture composite of claim 1, wherein the textured composite material further comprises a backing layer.

27. The texture composite of claim 26, wherein the backing layer is a felt with a basis weight in the range of about 4 to about 30 oz/yd$^2$ and a needle punched with a density of about 300 to about 1000 penetrations per inch.

28. The texture composite of claim 27, wherein the backing layer is needle punched from the bottom.

29. The texture composite of claim 28, wherein a thermoplastic binder layer is attached to the backing layer.

30. The texture composite of claim 27, wherein the backing layer comprises about 60% to about 90% polyester and about 10% to about 40% polyolefin.

31. The texture composite of claim 30, wherein the polyester comprises fibers about 5 to about 25 denier per filament and the polyolefin comprises fibers having about 1 to about 3 denier per filament.

32. The texture composite of claim 30, wherein the polyester fibers have a length of about 1.5 inches to about 6 inches and the polyolefin fibers have a lengthofabout 0.5 inch to about 2 inches.

33. The texture composite of claim 26, wherein the backing layer and the adhesive layer are pre-integrated.

34. The texture composite of claim 33, wherein the backing layer and the adhesive layer are laminated by needling.

35. The textured composite of claim 34, wherein the materials of the backing and adhesive layers are substantially evenly blended and wherein the adhesive layer comprises about 20% to about 60% of the total weight of the combined weights of said two layers.

36. The textured composite of claim 35, wherein the backing layer comprises adhesive fibers.

37. The textured composite of claim 36, wherein the backing layer comprises about 40% to about 80% polyester and about 20% toabout 60% polyolefin.

38. The textured composite of claim 26, wherein the surface area further comprises exposed areas of backing layer material each exposed area being peripherally surrounded by a depressed area.

39. The textured composite of claim 38, wherein the fibers of the fibrous outer layer have a color scheme and the backing layer has a color such that the exposed areas of backing layer material in combination with the color scheme of the fibrous outer layer impart to the textured composite material a preselected color-coordinatd appearance.

40. The textured composite of claim 26, wherein the backing layer has a plurality of strata and each stratum being of a different color, and wherein the color of preselected stratum is exposed on the surface area of the composite.

41. The texture composite of claim 1, wherein the textured composite material further comprises a liquid impermeable layer.

42. The textured composite of claim 41, wherein the liquid impermeable layer is impermeable to gas.

43. The textured composite of claim 41, wherein the liquid impermeable layer is impermeable to gas.

44. The textured composite of claim 1, wherein the fibrous outer layer comprises at least one woven layer.

45. The textured composite of claim 44, wherein the nonwoven layer is stitch-bonded.

46. The textured composite of claim 1, wherein the fibrous outer layer comprises at least one woven layer.

47. The textured composite of claim 46, wherein a surface of the woven layer adjacent to the adhesive layer is raised.

48. The textured composite of claim 1, wherein the fibrous outer layer comprises at least one knit layer.

49. The textured composite of claim 48, wherein a surface of the knit layer adjacent to the adhesive layer is raised.

50. The textured composite of claim 1, wherein the fibrous outer layer comprises an open layer and a closed layer.

51. The textured composite of claim 50, wherein the open layer is the lace layer.

52. The textured composite of claim 1, wherein the depressed areas are interconnected to form a first pattern on the surface area.

53. The textured composite of claim 52, wherein the first pattern comprises a plurality of parallel lines.

54. The textured composite of claim 52, wherein the first pattern comprises a plurality of wavy lines.

55. The textured composite of claim 53, wherein the first pattern comprises two intersecting groups of parallel lines.

56. The textured composite of claim 1, wherein a plurality of central portions of the depressed areas are removed from the composite.

57. The textured composite of claim 56, wherein substantially all of the central portions are removed from the composite.

58. The textured composite of claim 1, wherein the fibrous outer layer comprises a spunlaced nonwoven fabric.

59. The textured composite of claim 58, wherein the spunlaced nonwoven fabric has a basis weight in the range of about 1 to about 5 oz/yd$^2$.

60. The textured composite of claim 58, wherein the spunlaced nonwoven fabric comprises fibers shorter than about 2 inches.

61. The textured composite of claim 58, wherein the spunlaced nonwoven fabric is a layered woodpulp/staple composite.

62. A textured composite material having a surface area and comprising a continuous or integral fibrous outer layer and a contiguous adhesive layer, wherein the surface area comprises and embossed, contoured surface with depressed areas and elevated areas on the surface area, wherein in the depressed areas the fibers of the fibrous outer layer are anchored in the adhesive layer, and within the elevated areas the fibers of the fibrous outer layer form loops upstanding from the adhesive layer and bridging two or more depressed areas, and wherein the top and bottom surfaces of the adhesive layer follow substantially the same contour,
   wherein a combined density of the fibrous outer layer and the adhesive layer in the depressed areas is at least 0.7 g/cm$^3$,
   wherein a lateral distance between adjacent depressed areas in at least one direction is from about 1.5 mm to about 10 mm,
   wherein the elevation of the elevated area, D, is greater than the thickness of fibrous layer, $T_f$, In the elevated area, and
   wherein the textured composite material is useable as a floor cover.

63. The textured composite of claim 62, wherein the density is at least 1.0 g/cm$^3$.

64. The textured composite of claim 62, wherein the density is about 1.3 g/cm$^3$ or less.

65. The textured composite of claim 62, wherein within the depressed areas the adhesive layer penetrates through to at least a portion of the top of the fibrous layer.

66. The textured composite of claim 62, wherein the density of the fibrous outer layer is in the range of about 0.1 g/cm$^3$ to about 0.6 g/cm$^3$.

67. The textured composite of claim 62, wherein the composite has a reverse side opposite the fibrous outer layer and the reverse side has an undulationg profile.

68. The textured composite of claim 62, wherein the surface area further comprises transition areas disposed between the depressed areas and the elevated areas.

69. The textured composite of claim 62, wherein the adhesive layer is liquid permeable.

70. The textured composite of claim 62, wherein the depressed areas are interconnected to form a first pattern on the surface area.

71. The textured composite of claim 62, wherein the depressed areas are interconnected to form a first pattrn on the surface area.

72. The textured composite of claim 62, wherein the fibrous outer layer comprises a spunlaced nonwoven fabric.

73. The textured composite of claim 62, wherein the fibrous outer layer comprises thermoplastic fibers throughout the layer.

74. The textured composite of claim 62, wherein the fibrous outer layer is homogeneous.

75. The textured composite of claim 62, wherein the composite remains substantially flat in response to temperature change.

76. The textured composite of claim 62, wherein the composite remains substantially flat in response to temperature change.

77. The textured composite of claim 62, wherein a ratio of the elevation of the elevated area, D, to the thickness of fibrous layer, $T_f$, in elevated area is greater then about 1.25.

78. The textured composite of claim 77, wherein said ratio is greater than about 1.50.

79. The textured composite of claim 62, wherein the textured composite material further comprises a backing layer.

80. The textured composite of claim 79, wherein the backing layer and the adhesive layr are pre-integrated.

81. The textured composite of claim 79, wherein the backing layer and the adhexive layer are laminated by needling.

82. The textured composite of claim 81, wherein the backing layer comprisis adhesive fibers.

83. The textured composite of claim 79, wherein the surface area further comprises exposed areas of backing layer material each exposed area being peripherally surrounded by a depressed area.

84. The textured composite of claim 83, wherein the fibers of the fibrous outer layer have a color scheme and the backing layer has a color such that the exposed areas of backing layer material in combination with the color scheme of the fibrous outer layer impart to the textured composite material a pre-selected color-coordinated apperarance.

85. The textured composite of claim 79, wherein the backing layer has a plurality of strata and each stratum being of a different color, and wherein the color of preselected stratum is exposed on the surface area of the composite.

86. The textured composite of claim 62, wherein the textured composite material further comprises a liquid impermeable layer.

87. The textured composite of claim 86, wherein the liquid impermeable layer is permeable to gas.

88. The textured composite of claim 86, wherein the liquid impermeable layer is impermeable to gas.

* * * * *